United States Patent
Taniguchi et al.

[11] Patent Number: 6,099,134
[45] Date of Patent: Aug. 8, 2000

[54] LIQUID CRYSTAL DISPLAY DEVICE

[75] Inventors: Hitoshi Taniguchi; Yasuo Hira, both of Yokohama; Yuji Mori, Mobara, all of Japan

[73] Assignee: Hitachi, Ltd., Tokyo, Japan

[21] Appl. No.: 08/938,703

[22] Filed: Sep. 26, 1997

[30] Foreign Application Priority Data

Sep. 27, 1996 [JP] Japan ................................. 8-257037
Jul. 31, 1997 [JP] Japan ................................. 9-205768

[51] Int. Cl.[7] ........................................................ F21V 7/04
[52] U.S. Cl. .................................. 362/31; 362/19; 349/65
[58] Field of Search ................................. 362/31, 26, 19, 362/330; 349/65, 64, 67, 62

[56] References Cited

U.S. PATENT DOCUMENTS 5,764,322  6/1998  Mamiya et al. .......................... 349/65
5,779,338  7/1998  Ishikawa et al. ........................ 362/31

FOREIGN PATENT DOCUMENTS

| | | |
|---|---|---|
| 51-37149 | 10/1977 | Japan . |
| 4-162002 | 6/1992 | Japan . |
| 3-67004 | 3/1994 | Japan . |
| 8-82635 | 3/1994 | Japan . |
| 6-102402 | 4/1994 | Japan . |
| 6-242320 | 9/1994 | Japan . |
| 7-5462 | 1/1995 | Japan . |
| 7-294745 | 11/1995 | Japan . |
| WO 94/06051 | 3/1994 | WIPO . |

OTHER PUBLICATIONS

"Models of Disorder", J. M. Ziman, Published by Maruzen Co., Ltd. (Jul., 1962) pp. 58 et seq.

*Primary Examiner*—Cassandra Spyrou
*Assistant Examiner*—Euncha Cherry
*Attorney, Agent, or Firm*—Antonelli, Terry, Stout & Kraus, LLP

[57] ABSTRACT

A backlighting unit for a liquid crystal display device includes a light guide plate and an optical member, one of which is provided with a random dot disposition pattern so that luminance of the backlighting unit is uniform over the surface thereof while suppressing moiré and dot visibility. A dot pattern of concave or convex portions effective for reflection, scattering, refraction, diffraction, absorption, transmission, polarization or deflection of light rays or portions exhibiting different optical characteristics or portions imparted with optical activity is formed in a surface of the light guide plate or optical member. The dot pattern is determined to exhibit randomness by using random numbers so as to meet predetermined conditions concerning radial distribution function. In the random dot pattern superposed onto a regular color filter pattern, occurrence of moiré is suppressed. A dot overlap suppressing processing is performed for preventing inter-dot overlap and abnormal proximity between the adjacent dots.

20 Claims, 25 Drawing Sheets

FILTER PATTERN

RANDOM DOT PATTERN

COMBINED PATTERN OF SUPERPOSED
FILTER AND DOT PATTERNS

FILTER PATTERN

REGULAR DOT PATTERN

COMBINED PATTERN OF SUPERPOSED
FILTER AND DOT PATTERN

DOT SHAPES (IN PERSPECTIVE VIEW)

DOT SHAPES (IN FRONT VIEW)

LIQUID CRYSTAL DISPLAY DEVICE

BACKGROUND OF THE INVENTION

The present invention relates to a liquid crystal display device in which a lighting unit such as a backlighting unit is employed.

In recent years, implementation of personal computers inclusive of so-called word processors in a small size has been promoted, and portable type personal computers known as lap-top type or notebook type computers are widely used. In such portable type personal computer, a liquid crystal device is commonly used as a display unit. In this conjunction, there is an increasing tendency for adopting color display in the portable type personal computers. In accompanying with such trend, a backlighting type liquid crystal display device is coming into wide use, in which a light source is disposed at a rear side of a liquid crystal display screen for lighting the whole display screen or panel from the rear or back side. Needless to say, the backlighting light source for the color liquid crystal display device is required to emit light with high luminance or intensity. Besides, it is necessary to illuminate the display screen with uniform luminance over the whole planar surface thereof. Luminance of the backlighting can easily be increased by increasing that of the light source. However, taking into consideration the fact that the portable-type personal computer or word processor or the like are usually operated by using a battery or cell, limitation is unavoidably imposed to the attempt for increasing the luminance of the light source. To say in another way, there has been proposed no effective method or measures for increasing the luminance of the liquid crystal display screen.

For having better understanding of the present invention, conventional liquid crystal display devices such as disclosed, for example, in Japanese Unexamined, Patent Application Publications Nos. 162002/1992 (JP-A-4-162002) and 67004/1994 (JP-A-6-67004), will first be reviewed briefly. FIG. 33 shows a lateral source type backlighting device employed conventionally in the liquid crystal display device known heretofore. Referring to the figure, a lamp such as a cold-cathode discharge tube or a hot-cathode discharge tube is employed as a light source 1 which is disposed at and along one lateral side of a light guide plate (also known as optical waveguide plate) 2 which is made of a light-transmissive material, wherein a light scattering layer 3 for scattering light rays and a light reflecting sheet 4 for reflecting light rays are disposed on the bottom surface of the light guide plate 2 while a diffusing sheet 5 formed of a synthetic resin of milk-white color having a light scattering effect is mounted over a top surface of the light guide plate 2 with a view to uniformizing luminance of the backlight over the whole display screen. Additionally, there are disposed on the diffusing sheet 5 a pair of light collecting plates 6 and 7 in order to enhance axial luminance (i.e., luminance in the direction orthogonal to the display screen) of the liquid crystal display device by converging diffused light rays.

On the other hand, according to another proposal disclosed, for example, in Japanese Unexamined Patent Application Publication No. 294745/1995 (JP-A-7-294745), grating grooves are formed in the bottom surface of the light guide plate for reflecting the light rays incident on the light guide plate.

As is apparent from the foregoing description, in the conventional backlighting units for the liquid crystal display devices known heretofore, light rays emitted from the light source 1 and introduced into the optical waveguide or light guide plate 2 undergo scattering at light scattering substance contained in the light scattering layer to illuminate the liquid crystal element after having transmitted through the diffusing sheet. It can readily be understood that the structure of the conventional backlighting optical waveguide or light guide panel for the liquid crystal display device is much complicated. Besides, the luminance of the liquid crystal display device becomes lower as a whole because of loss due to the light scattering, giving rise to a problem. Further, the backlighting unit provided with the grating grooves is difficult to manufacture by resorting to a die molding method or the like.

As an approach for decreasing the number of parts of the backlighting unit as well as the number of steps involved in assembling or manufacturing the same while enhancing the performance or operation characteristics thereof, it is conceived to develop a novel structure composed of concave and or convex portions effective for reflection, scattering, refraction, diffraction, absorption, transmission, polarization or deflection of light rays or portions exhibiting variable optical characteristics or portions imparted with optical activity such as electro-optic effect. Parenthetically, the concave portions, the convex portions, the portion having variable optical characteristics and the optically activated portion mentioned above will hereinafter be referred to generally as the dot. By forming the dots mentioned above on a top or bottom surface of the light guide plate or alternatively on an optical member disposed on the top or bottom surface of the light guide plate, the diffusing sheet 5 and the light collecting plate 6 can be spared.

However, the structure described above suffers a problem that when the dot area is dimensioned large, there takes place a so-called dot visibility phenomenon, i.e., the phenomenon that the dots are visually perceived as spot-like objects. This problem can be coped with by deceasing the dot area so that the dots can not be visually perceived. In that case, however, because the dots are disposed regularly, there may arise another problem that moiré takes place due to interference between the dot array and an RGB-matrix of a color filter provided on the top or bottom side of the optical member disposed on the top or bottom surface of the light guide plate or a regular pattern of thin film transistors (TFTs).

On the other hand, when the dots are disposed at random in an effort to suppress the moiré phenomenon, then non-uniformity or unevenness in the luminance distribution as well as the dot visibility problem mentioned above may be brought about due to unevenness in the dot density, giving rise to yet another problem. For dealing with these undesirable phenomena, use of a diffusing sheet may be conceived. However, incorporation of such diffusing sheet in the liquid crystal display device in turn means that the number of constituent parts of the device increases while presenting a cause for degrading the transmittance, impairing eventually brightness of the display screen.

SUMMARY OF THE INVENTION

In the light of the state of the art described above, it is an object of the present invention to provide an liquid crystal display device which can solve satisfactorily the problems of the dot visibility, the nonuniform luminance distribution and the moiré phenomenon.

In view of the above and other objects which will become apparent as the description proceeds, there is provided according to the invention a liquid crystal display device which is equipped with a backlighting unit which includes a liquid crystal cell array and a light guide plate disposed at a rear side of a liquid crystal cell array, wherein at least either a top surface or bottom surface the light guide plate or alternatively an optical member disposed on the top or bottom surface of the light guide plate is provided with convex-shaped or concave-shaped dots capable of reflecting or scattering or refracting or diffracting or absorbing or transmitting or polarizing or deflecting light rays or alternatively dots having different optical property or alternatively dots imparted with optical activity such as electro-optic effect, the dots are formed and disposed at random such that one or more of requirements mentioned below in conjunction with aspects or features (1) to (8) of the present invention.

Feature (1)

According to the first aspect or feature of the present invention, it is proposed that in a region covering more than 80% and preferably more than 99% of a whole surface area in which the dots are to be formed (hereinafter this surface as well as the surface having the dots formed will be referred to generally as the dot-formed surface), the dots are disposed in such a manner as mentioned below. Namely, the dot-formed surface is divided into square regions each of 1 to 4 $mm^2$, wherein in each of the square regions, the dots are disposed such that a function G(R) determined on the basis of disposition of all the dots formed in the square region satisfies the condition that 0<S1/S2<0.4 and preferably 0<S1/S2<0.02 when a value R/R0 is within a range of "3" to "6", where R represents a distance from a center position of a given dot to another one for all the dots, R0 represents a value $L/\sqrt{N}$ obtained by dividing the length L of one side of the square region by a square root of the number N of dots contained in the square region, i.e., a length of a square having an area equal to a mean area occupied by one dot in the square region, G(R) represents a radial distribution function obtained by averaging undermentioned radial distribution functions g(R) with weight and approximating by resorting to a least squares method, g(R) represents a radial distribution function determined on the basis of disposition of dots, S1 represents a value obtained by integrating |G(R)−{mean value of G(R)}| with a ratio R/R0 on the condition that the value of the ratio R/R0 is within a range of "3" to "6", and S2 represents a value obtained by integrating the mean value of the radial distribution function G(R) with the ratio R/R0 on the condition that the value of the ratio R/R0 is within a range of "3" to "6".

In the dot disposition mentioned above, the area of the square region derived from the aforementioned division should contain at least twenty dots and more preferably more than fifty dots inclusive.

At this junction, it will be helpful for understanding the invention to elucidate the radial distribution function g(R).

FIG. 6A is a view for illustrating, by way of example, division of the dot-formed surface into square block each of 1 to 4 $mm^2$ wherein each block corresponds to the square region mentioned above. The area of each square region should preferably be so selected that at least twenty and more preferably more than fifty dots are contained in each square region.

FIG. 6B is an enlarged view of FIG. 6A showing nine (=3×3) square regions within a region indicated as enclosed by a circle A in FIG. 6A. Referring to FIG. 6B, the dots indicated by small solid circles or spots are so disposed as to meet the requirement mentioned hereinbefore in conjunction with the feature (1). The radial distribution function g(R) mentioned above is determined for each of the dots and indicates on a dot-by-dot basis in what manner the other dots are distributed, as viewed from a given one dot for which the radial distribution function g(R) is to be determined.

FIG. 7 is a diagram showing a distribution state of the dots as viewed from a given dot P in a pattern of circles each having a center at the dot P, each being assumed as having at least one dot thereon. The radii of these circles represent the aforementioned distances R to the other dots, respectively. In FIG. 7, six circles having the radii R=$r_1$, $r_2$, $r_3$, $r_4$, $r_5$ and $r_6$ (where $r_1<r_2<r_3<r_4<r_5<r_6$) are shown.

Now, representing by N(R) the number of the other dots located on the circles having the respective radii R, the radial distribution function g(R) can be defined by the following expression (1):

$$g(R) = \sum_R \frac{N(R)}{R} \quad (1)$$

where N(R)/R represents normalization or standardization of the number N(R) of the other dots on the circle of the radius R with this radius (i.e., the distance to the dot position). Accordingly, it can be said that the radial distribution function g(R) is equivalent to the sum of the dot numbers normalized or standardized with the distances R.

By way of example, let's determine the radial distribution function g(R) for the dot P on the presumption that six circles having the radii R (R=r1 to r6), respectively, exist around the dot P. Referring to FIG. 7, N(r1)=4 in case R=r1, N(r2)=4 in case R=r2, N(r3)=4 in case R=r3, N(r4)=8 in case R=r4, N(r5)=4 in case R=r5, and N(r6)=4 in case R=r6.

Assuming again that the individual dots are disposed in a lattice-like array with equal inter-dot distance and that the length of one side of the lattice, e.g. r1 is equal to 1.00, then r2=1.41, r3=2.00, r4=2.45, r5=2.82, and r6=3.00.

Thus,

N(r1)/r1=4.00,

N(r2)/r2=2.84,

N(r3)/r3=2.00,

N(r4)/r4=3.26,

N(r5)/r5=1.42, and

N(r6)/r6=1.33.

FIG. 8A is a view for graphically illustrating the value of the radial distribution function g(R) for the dots on the circles having the radii or distances R relative to the dot P.

In the case where the dots are regularly disposed or arrayed, as shown in FIG. 7, distributions of the other dots relative to every dot within the square region shown in FIG. 6A are equal to one another. Consequently, the radial distribution function g(R) is same for all the dots. More specifically, the radial distribution function g(R) for all these dots assumes values such as shown in FIG. 8A.

Incidentally, the range for determining the radial distribution function g(R), i.e., the range of the distances R, need not be selected excessively large. In other words, the maximum value to be adopted for the distance R can be determined appropriately. The values of the radial distribution function g(R) are determined for all the dots, respectively, within the square region. However, the range of the distance R may be outside of the square region. By way of example, referring to FIG. 6B, let's suppose that the radial distribution function g(R) is to be determined for the dot P located at a position close to an edge of the square region. In that case, the range of the radial distribution function g(R) to be determined for the dots within the circle B relative to the center dot P may extend into the adjacent square region.

On the other hand, in the case where the dots are disposed irregularly or at random, positional relations of the other dots as viewed from each of the dots become different from one to another dot, which in turn means that the distances R to the other dots become different for each of the dots. Thus, in this case, the values of the radial distribution function g(R) are distributed substantially continuously when compared with the regular dot disposition, as can be seen from FIG. 8B.

FIGS. 9A to 9D are views for illustrating graphically a method of determining the radial distribution functions G(R) by averaging with weight the values of the radial distribution function g(R) for all the dots within the square regions as divided. More specifically, FIG. 9A shows distribution of the values of the radial distribution function g(R) in the case where the dots are regularly disposed, FIG. 9B shows values of the radial distribution functions G(R) in the case where some randomness is added to the regular dot disposition, FIG. 9C shows the values of the radial distribution function G(R) in the case where the dots are disposed significantly randomly with some regularity being still maintained, and FIG. 9D shows the values of the radial distribution function G(R) in the case where the dots are disposed quite randomly. In the case where the dots are arrayed regularly, distribution of the values of the radial distribution function G(R) is completely discontinuous due to the inherent nature of the radial distribution function g(R) elucidated previously by reference to FIG. 7 and FIGS. 8A and 8B. However, as the randomness increases, distribution of the values of the radial distribution function G(R) becomes more continuous, and in the case where the dots are disposed completely at random, the values of the radial distribution function G(R) are distributed completely uniformly in continuation.

As will now be understood, the radial distribution function g(R) and hence the radial distribution function G(R) can serve as the index for indicating the degree or extent of randomness of the dot disposition.

For more particulars of the radial distribution functions, reference may be made to J. M. Ziman's "PHYSICS OF TURBULENCE", published by Maruzen Co., Ltd. (July, 1962), pp. 58 et seq.

Now, according to the feature (1) of the present invention, the dots disposition in each of the square regions is so determined that the radial distribution function G(R) which is given as a function of R/R0 (where R0 represents a constant determined on the basis of disposition of all the dots formed in the square region) satisfies the condition that $0<S1/S2<0.4$ and preferably $0<S1/S2<0.02$ when the value of the ratio R/R0 is within a range of "3" to "6".

In this conjunction, S1 represents a value obtained by integrating $|G(R)-\{$ mean value of $G(R)\}|$ with R/R0 on the condition that the value of R/R0 is within a range of "3" to "6". In the case where the radial distribution function G(R) is such as illustrated in FIG. 10A, the value mentioned above is equivalent to a value obtained by integrating a hatched area in the range in which the value of R/R0 is of "3" to "6". The value S2 is obtained by integrating the mean value of the radial distribution function G(R) with R/R0 in the range where the value of R/R0 is of "3" to "6". In more concrete, assuming that the radial distribution function G(R) is such as illustrated in FIG. 10B, the value mentioned above corresponds to a value obtained by integrating a hatched area over a range where the value of R/R0 is of "3" to "6". Accordingly, the value of the ratio S1/S2 represents a ratio of the change of the radial distribution function G(R) relative to the mean value of the values of the radial distribution function G(R). As is apparent from the description made by reference to FIGS. 9A to 9D, a smaller value of S1/S2 indicates that randomness of the dot disposition is more significant and the value of S1/S2 approaches zero as the randomness increases.

In conjunction with the range of the value of R/R0, it should be added that when this value is excessively large, the time taken for the arithmetic operation or calculation increases undesirably, being possibly accompanied with error. On the other hand, when the value range of R/R0 is excessively small, influence of the dot overlap suppressing processing makes appearance, which is unpreferable, as will be discussed hereinafter. For these reasons, the value of R/R0 should preferably be so selected as to fall within the range from "3" to "6", as mentioned above.

Additionally, a smaller value of S1/S2 means that randomness imparted to the dot disposition becomes more significant. After numerous experiments and examinations, it has been observed that the random dot disposition which is effective for suppressing the moiré phenomenon can be realized by setting the value of S1/S2 in the range mentioned above.

Feature (2)

In conjunction with the feature (1) described above, it is proposed according to a second aspect or feature that the dots are preferably so formed and disposed that relation between G1 and G2 satisfies the condition that $G1/G2<0.95$ and more preferably $G1/G2<0.05$, wherein G1 represents a mean value of the values of the radial distribution function G(R) within a range of values of the distance R not greater than the radius r of a circle having an area equal to that of the dot, and G2 represents a mean value of the values of the radial distribution function G(R) within a range of the distance or radius R satisfying the condition that $R<5\times R0$.

FIG. 11 is a view for graphically illustrating the values G1 and G2 relative to the radial distribution function G(R) on the assumption that $r=R0/4$. The ratio G1/G2 indicates the degree of the inter-dot overlap and/or inter-dot proximity. A smaller value of the ratio G1/G2 indicates that the degree of the inter-dot overlap and/or inter-dot proximity is mall. Numerous experiments and examinations have shown that the inter-dot overlap can effectively be suppressed by setting the value of G1/G2 as mentioned above.

Feature (3)

In conjunction with the features (1) and (2) described above, it is proposed according to a third aspect or feature of the present invention that the surface having the dots formed thereon should preferably be divided into square regions each having an area ranging from 1 to 4 mm$^2$ and that each of the square regions which is not less than 80% of all the square regions be further divided equally into four subregions, wherein the dots are so formed and disposed that the dot density in each of the subregions is within a range of ±20% of the mean dot density of the square region to which the subregions belong. This arrangement is effective for suppressing nonuniformity of luminance distribution.

Feature (4)

In conjunction with the features (1), (2) and (3) described above, it is further proposed according to a fourth aspect or feature of the present invention that each of at least 80% of the dots is dimensioned that the diameter of a circle having an area equal to that of the dot is not smaller than 0.001 mm and not greater than 0.15 mm, and more preferably not smaller than 0.01 mm and not greater than 0.05 mm. This arrangement is effective for suppressing visibility of the dots (i.e., visual perception of the dots).

The dot dispositions according to the aspects or features (1) to (4) of the invention are very effective in particular when the length of the dot as viewed in the direction parallel to a light source is approximately equal to the length of the same as viewed in the direction perpendicular to the light source (see FIG. 13) as exemplified by the dot having a planar shape (i.e., shape as viewed in the direction orthogonal to the plane of the dot-formed surface) which is circular or square or the like, as is illustrated in FIG. 12A. By contrast, when the length as viewed in the direction parallel to the light source is different from the length as viewed in the direction perpendicular to the light source as exemplified by the dot having a planar shape which is oblong or the like and when the former is longer or greater than the latter, as is illustrated in FIG. 12B, it is advantageous to dispose the dots in such a manner as mentioned below in the dot arrangement according to the aspect or feature (1) of the invention. Parenthetically, with the phrase "oblong", it is contemplated to encompass not only rectangles in the intrinsic sense but also modified rectangles such as rectangle having corner(s) rounded, rectangle having one side elongated, trapezoid-like rectangle and the like. At this juncture, it should also be mentioned that the dot shapes shown in FIGS. 12A and 12B are only for the purpose of illustration and thus the invention is never restricted exactly to them. In the dot having a greater length in the direction parallel to the light source than the length in the direction perpendicular to the light source, the area of a dot portion reflecting or refracting light rays can be increased relative to the area of the dot, whereby the number of dots can be significantly decreased, which in turn contributes to facilitation of manufacturing of the backlighting unit and hence the liquid crystal display device.

Feature (5)

According to a fifth aspect or feature (5) of the present invention, it is proposed in addition to the aspect (1) mentioned hereinbefore that the dots should preferably be so formed and disposed that the radial distribution function G(R) is substantially equal to zero in the range of the distance R which is smaller than the dot width Ly and has at least two peaks, at least one of which makes appearance within a range given by Lx>R>Ly while at least one of the two peaks makes appearance within a range given by R>Lx, as illustrated in FIG. 14. In the case of the example illustrated in this figure, a first peak 8 of the radial distribution function G(R) exists within the range of the distance R represented by Lx>R>Ly with the second peak 9 of the radial distribution function G(R) lying within the range represented by R>Lx, where Lx represents a width of each of the dots in the direction parallel to the light source, as shown in FIG. 12B, and Ly represents a width of each of the dots in the direction perpendicular to the light source, as shown in FIG. 12B.

Feature (6)

According to a sixth aspect or feature of the present invention, it is proposed in addition to the features (1), (4) and (5) that in respect to the dot size, at least 80% of all the dots meet the conditions that 0.05 mm<Lx<1.0 mm and that 0.03 mm<Ly<0.09 mm. More preferably, at least 80% of the dots are so formed as to meet the conditions that 0.1 mm<Lx<0.3 mm and that 0.03 mm<Ly<0.09 mm. In this conjunction, the dot widths Lx and Ly are selected such that the condition given by Lx>Ly and more preferably Lx>Ly×2 can be satisfied.

Feature (7)

In accordance with a seventh aspect or feature of the present invention, it is proposed in addition to or in combination with the aspects or features (1), (2) and/or (3) that in the case where a liquid crystal display device has a diagonal length greater than 20 cm and where the planar shape of the dot is circular or square or the like, as is illustrated in FIG. 12A, the area of the dot is so selected that it is not smaller than 0.0001 mm$^2$ and not greater than 0.09 m$^2$ Feature (8)

According to an eighth aspect or feature of the present invention, it is proposed in addition to the feature (1) to form and dispose the dots such that the value of the radial distribution function G(R) becomes substantially zero on the condition that the distance R is smaller than the dot diameter.

By forming the random dots incarnating at least one of the aspects or features mentioned above, it is possible to implement the liquid crystal display device which suffers neither the moiré nor the dot visibility nor the uneven luminance distribution.

As one of the methods for determining the disposition of the dots described above, there may be mentioned a method of making use of a random number.

More specifically, as the method of determining the coordinates of the dots for the random disposition thereof, it is conceived to dispose or position the dots at lattice points of a lattice having regularity and then move the positions of the dots from the lattice points by distances or deviations determined by making use of the random number. By virtue of this method, unevenness or non-uniformness in the dot density can be suppressed significantly while ensuring the desired randomness.

Furthermore, as a method of determining the coordinates for the random disposition of the dots, it is equally effective that after determination of the coordinates for the dot disposition or in the course of determining the coordinates by using the random number, only the dots located at the coordinates at which interdot overlap or extremely close proximity takes place are deleted in order to prevent the dots from overlapping or abnormal proximity, and thereafter the coordinates for the deleted dots are again determined by using newly generated random number. Hereinafter, this method will be referred to as the dot overlap suppressing method or processing.

Furthermore, as a method of determining the coordinates for the random disposition of the dots, it is taught according to yet another aspect of the invention that the whole surface in which the dots are to be formed is divided into subregions (referred to as the cells) and the dot disposition in each of the cells is determined in accordance with one of the methods mentioned above, whereon the cells having the dots disposed are interconnected to one another for thereby determining the coordinates of all the dots. In that case, the dot overlap suppressing processing described previously should be performed not only for these cells but also for the cells located adjacent thereto.

In this conjunction, it is further proposed that the dot-formed surface is divided into subregions when it is preferred that the dot density increases or decreases regularly or irregularly in dependence on the locations of the dots in order to partially vary or uniformize the luminance while the dots are so formed and disposed as to have the randomness described previously. Furthermore, the method of varying the dot density in the cell by adopting the cellurizing method mentioned just above is equally effective.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIGS. 1A to 1C are views for illustrating the basic concept of the present invention incarnated in a liquid crystal display device according to a first embodiment of the invention, wherein FIG. 1A shows schematically a pattern of a color filter employed in the liquid crystal display device, FIG. 1B is a view showing schematically a random dot disposition pattern, and FIG. 1C shows schematically a combined pattern observed when the color filter pattern and the random dot pattern are superposed onto each other;

FIGS. 6A and 6B are views for illustrating division of a dot-formed surface into square regions and a range in which values of radial distribution functions g(R) for each dot in each square region are determined in the liquid crystal display device according to the first embodiment of the invention;

DESCRIPTION OF THE PREFERRED EMBODIMENTS

Figure 1A:
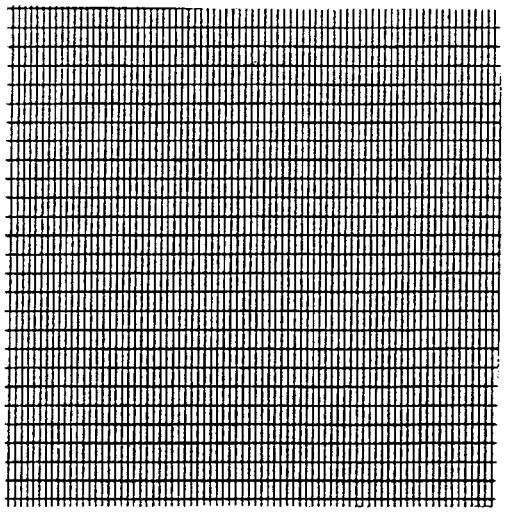

Now, the present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "left", "right", "top", "bottom", "vertical", "horizontal" and the like are words of convenience and are not to be construed as limiting terms.

Figure 1B:
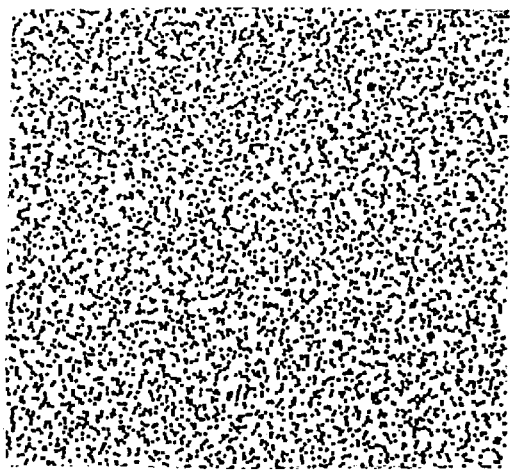
Figure 1C:
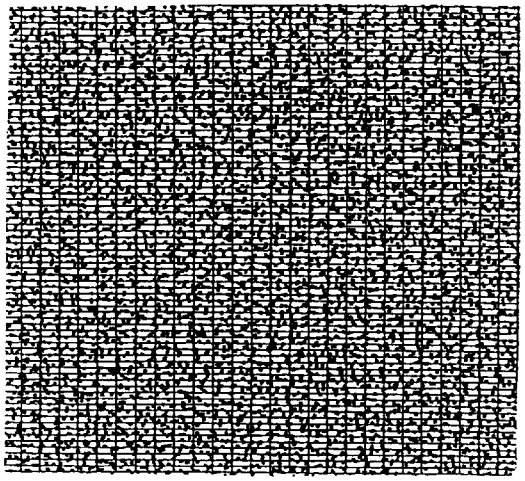

FIGS. 1A to 1C are views for illustrating the concept underlying the liquid crystal display device according to an exemplary embodiment of the invention which device has a dot pattern implemented so as to satisfy the requirement or requirements described hereinbefore in conjunction with the aspects or features of the present invention.

More specifically, a color liquid crystal display device according to the instant embodiment of the invention includes a backlighting unit comprised of a light guide plate which is provided with a random dot pattern meeting the previously mentioned requirement(s) and having light reflecting capability. A model of such random dot pattern is shown in FIG. 1B. In the color liquid crystal display device now under consideration, light rays emitted from the light guide plate of the backlighting unit are caused to pass through a color filter. In this conjunction, FIG. 1A shows schematically a model pattern of such color filter. As can be seen in FIG. 1A, the pattern of the color filter has a regularity. Further, FIG. 1C shows schematically a state in which the random dot pattern shown in FIG. 1B and the color filter pattern are superposed each other. As can be seen in FIG. 1C, none of interference patterns such as moiré makes appearance.

Figure 2A:
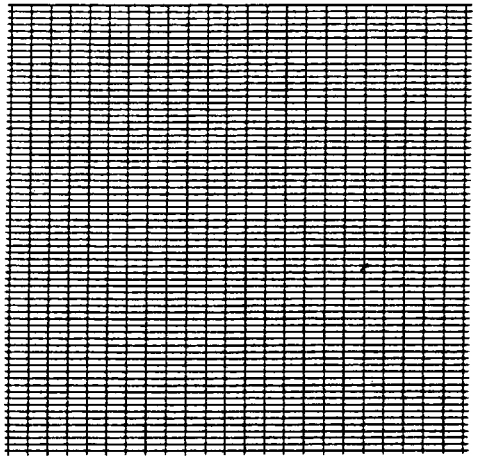
FIGS. 2A to 2C are schematic views corresponding to FIGS. 1A to 1C, respectively, in a conventional liquid crystal display device known heretofore.
Figure 2B:
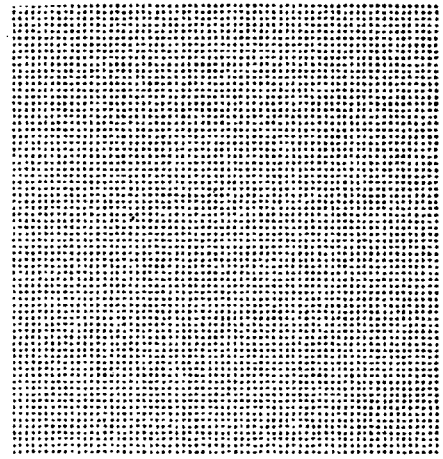
Figure 2C:
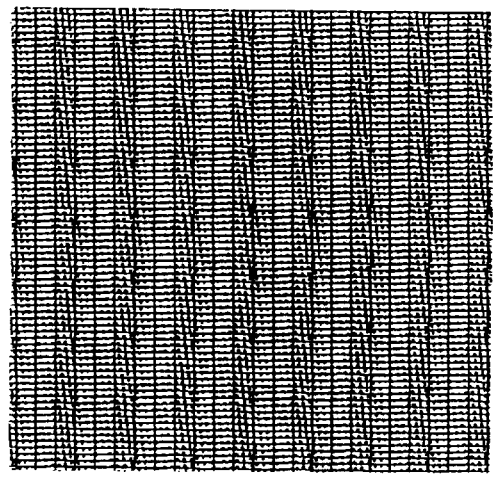
Figure 3:
FIG. 3 is a schematic view showing a random dot disposition pattern formed without adopting an dot overlap suppressing processing in the liquid crystal display device according to the first embodiment of the invention.

By contrast, FIGS. 2A to 2C are schematic views for illustrating principle underlying the conventional liquid crystal display device including the light guide plate provided with a regular dot pattern, a model of which is shown in FIG. 2B. When the regular dot pattern shown in FIG. 2B and a color filter having a pattern shown in FIG. 2A which is similar to that shown in FIG. 1A are superposed onto each other, moiré phenomenon may take place even when the positions of both the patterns are deviated only slightly, as can be seen in FIG. 2C.

In the course of developing the color liquid crystal display device which can avoid the problems of the conventional liquid crystal display device described hereinbefore, various random dot patterns have been prepared and examined, as a result of which it has been formed that the random dot pattern should be so formed and disposed as to meet the requirements described hereinbefore in conjunction with the aspects or features of the invention. More specifically, a dot-formed surface (i.e., surface of the light guide plate or optical member on which the dots are formed or to be formed) is divided into square regions each of 1 to 4 $mm^2$. In that case, the area of the square region resulting from the division should preferably be so determined as to contain at least twenty dots and more preferably contain more than fifty dots. In this conjunction, it is noted that when the area of the square region is smaller than 1 $mm^2$, the value of the constant R0 is usually in the range of 25 to 100 μm, which in turn means that the number of the dots contained in the square region is too small to calculate the values of the radial distribution function g(R) without difficulty. On the other hand, when the area of the square region is grater than 4 $mm^2$, change or modification of the dot density for correcting the quantity of light outputted from the light guide plate can not be evaluated with acceptable accuracy, making it difficult to correct local nonuniformity of the luminance distribution. Additionally, when the dot density is low, the area of the square region should preferably be so selected as to contain at least twenty dots and more preferably more than fifty dots.

Subsequently, the values of the radial distribution function g(R) are determined for all the dots contained in each of all the square regions, and then the radial distribution function G(R) is determined by averaging the values of the radial distribution function g(R) with weight and approximating with polynomial by resorting to a least squares method. In this radial distribution function G(R), when the value of S1/S2 exceeds 0.4 with the ratio R/R0 ranging from "3" to "6", moiré phenomenon takes place, as is shown in FIG. 2C. Besides, with the value of S1/S2 greater than 0.4, probability of the moiré interference taking place is substantially same as in the case of the regular dot disposition, indicating that no effective moiré suppression can be expected. By contrast, when the value of S1/S2 is not greater than 0.4, moiré can be prevented although positional alignment to some extent will be required to this end. Additionally, when the value of S1/S2 is not greater than 0.02, moiré can no more be observed, as is shown in FIG. 2C.

The proportion of the square regions imparted with the randomness in the dot disposition should be at least 80% and more preferably at least 99%. In case the proportion of the square regions having randomness in dot disposition is not greater than 80%, moiré will be observed in the square regions having no randomness in the dot disposition. Additionally, unless the proportion of the square regions having no dot randomness is greater than 1%, these square regions make appearance in the form of visible spots. Of course, such backlighting unit can nevertheless be employed although it depends on the positions of such spots.

Figure 4:
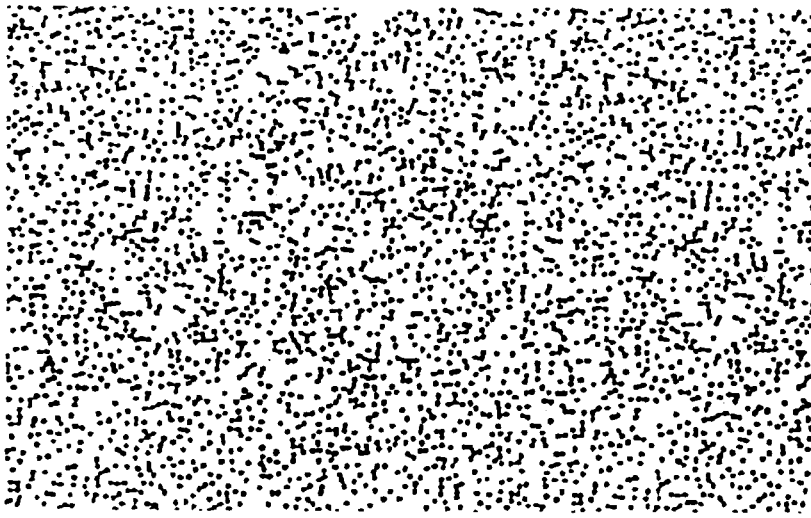
FIG. 4 is a view similar to FIG. 3 and shows a random dot disposition pattern formed by adopting the dot overlap suppressing processing.

Furthermore, when G1/G2>0.95, there can be observed those areas which have locally high or low dot density, being accompanied with the inter-dot overlap and the dot visibility. By contrast, when G1/G2<0.95, occurrence of the inter-dot overlap can be suppressed, which in turn is effective for suppressing the dot visibility. Thus, the dot disposition with randomness should be so selected that the value of G1/G2 is smaller than 0.95 although it depends on the size of the dots. It has been confirmed that when G1/G2 is smaller than 0.05, occurrence of the inter-dot overlap as well as the dot visibility problem can be suppressed satisfactorily, as is shown in FIG. 4.

Furthermore, the dot-formed surface is divided into square regions each having an area ranging from 1 to 4 mm$^2$ and then each of the square regions is again divided equally into four subregions. In that case, when the dot density in each of the subregions divided equally differs from the dot density of the parent square region by more than ±20%, unevenness in the luminance distribution due to nonuniformity in the dot density is observed. On the other hand, in the case where the above-mentioned value is not greater than ±20%, unevenness in the luminance distribution can be suppressed. Parenthetically, it should also be mentioned when the number of the subregions resulting from division of the square region is smaller than four, likelihood of occurrence of luminous spots increases. On the other hand, when the number of the subregions is greater than four, regularity of the dot disposition is enhanced, as a result of which moiré interference is more likely to occur.

As for the dot size, each of at least 80% of the dots is so dimensioned that the diameter of a circle having an area equal to that of the dot (hereinafter, this diameter will be referred to as the dot diameter) is not smaller than 0.001 mm and not greater than 0.15 mm, and more preferably not smaller than 0.01 mm and not greater than 0.05 mm. The dot having the diameter of 0.2 mm can be observed with the naked eyes. By contrast, the dot of 0.15 mm in diameter can not easily be discerned with the naked eyes. However, when the dot diameter is not greater than 0.001 mm, it becomes impossible to reflect or refract light rays in predetermined or desired directions because the dot area serving as the reflective/refractive surface is not sufficiently large when compared with the wavelength of light. For these reasons, the appropriate dot diameter should not be smaller than 0.01 mm and not greater than 0.05 mm. Unless the dot diameter is greater than 0.05 mm, the dots are difficult to discern with the naked eyes, whereby the dot visibility problem can easily be solved. Additionally, in view of the fact that the area of the reflective/refractive surface is not greater than a half of the dot area, it is desirable to select the dot diameter to be not smaller than 0.01 mm in order to ensure the desired light reflection and refraction. Besides, when the dot diameter is not greater than 0.01 mm, the number of the dots increases remarkably, providing obstacle to the manufacturing of the backlighting unit and hence the liquid crystal display device.

In the case of the liquid crystal display device having a diagonal length greater than 20 cm, it is preferred to select the number of the dots in total to be not greater than twenty hundred million in view of difficulty in fabricating molding die, mask and others. Consequently, the dot area should preferably be so selected that it is not smaller than 0.0001 mm$^2$.

Figure 12A:
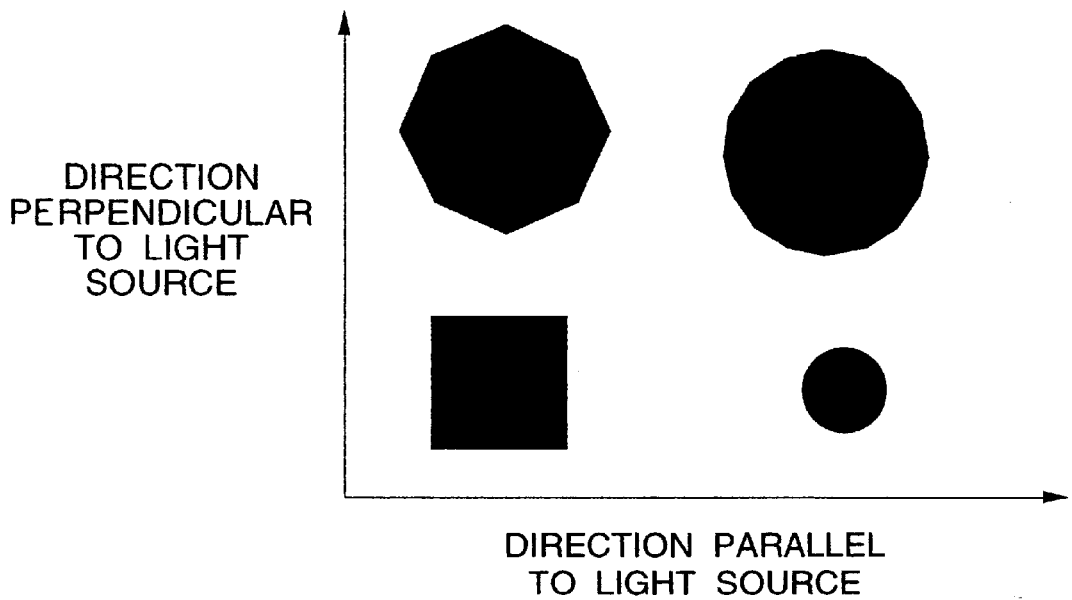
FIGS. 12A and 12B are schematic views for illustrating planar shapes which the dot may assume.
Figure 12B:
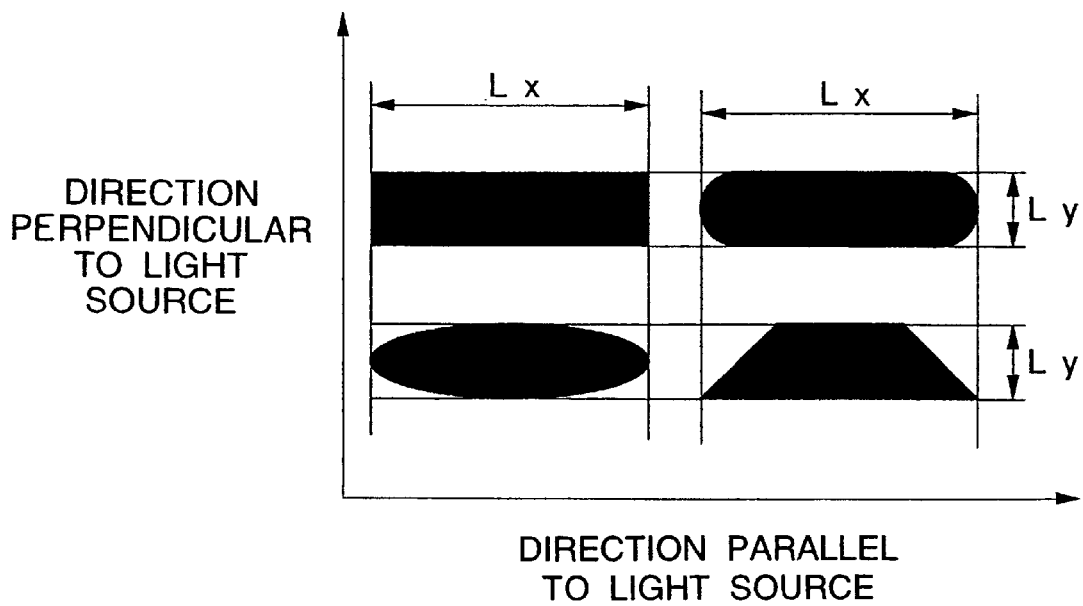
Figure 13:
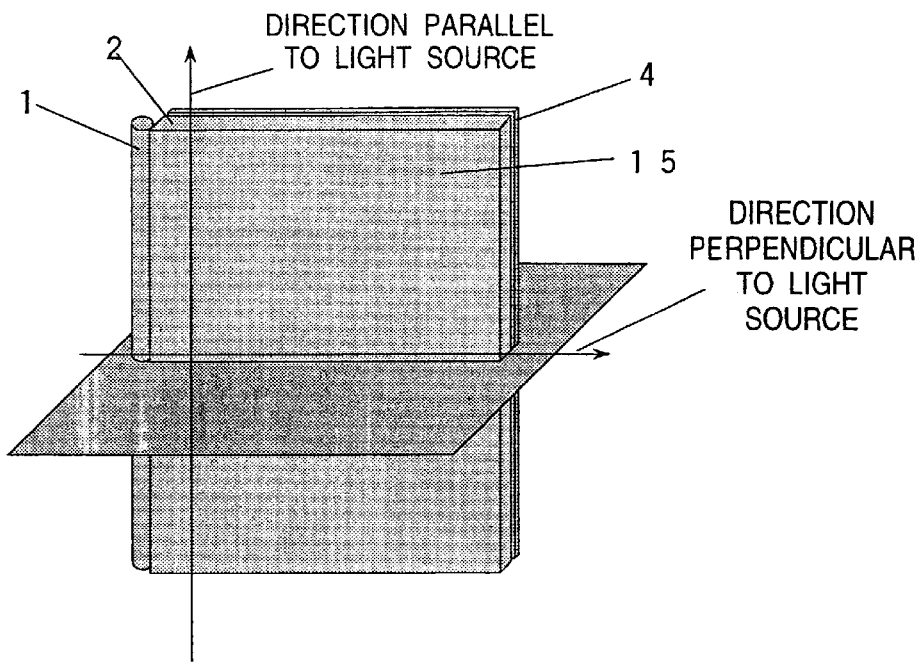
FIG. 13 is a schematic diagram for illustrating a coordinate system for the dot disposition.
Figure 14:
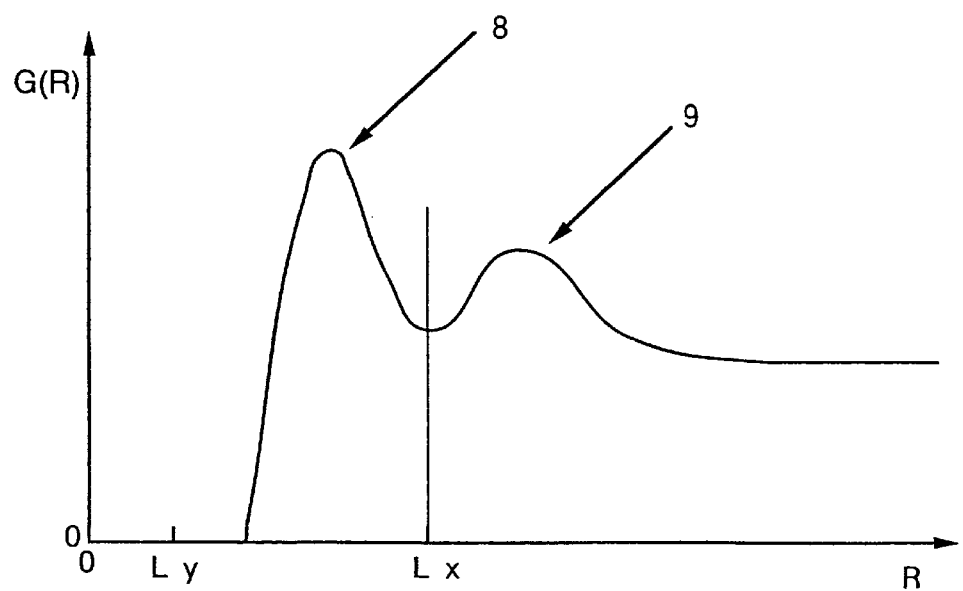
FIG. 14 is a view for graphically illustrating the radial distribution function G(R) in the case where the dot is substantially of a rectangular or oblong shape.

Further, when the planar shape or form of the dot is such that the length as viewed in the direction parallel to the light source is different from the length as viewed in the direction perpendicular to the light source and when the former is longer than the latter, as is illustrated in FIG. 12B, the dots should preferably be so formed and disposed that the radial distribution function G(R) is substantially equal to zero in the range of the distance R which is smaller than the dot width Ly and that a first peak 8 of the radial distribution function G(R) exists within the range of the distance R represented by Lx>R>Ly with a second peak 9 of the radial distribution function G(R) appearing in the range represented by R>Lx, as shown in FIG. 14. In the above description, symbol Lx represents a width of the dot in the direction parallel to the light source, as shown in FIG. 12B, and symbol Ly represents a width of each of the dots in the direction perpendicular to the light source, as shown in FIG. 12B.

Figure 5A:
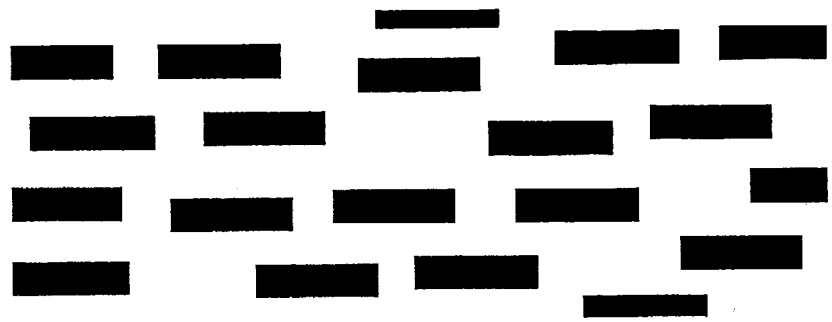
FIGS. 5A to 5C are schematic views showing random dot disposition patterns for illustrating the dot overlap suppressing processing in case the dots are formed in a rectangular shape.
Figure 5B:
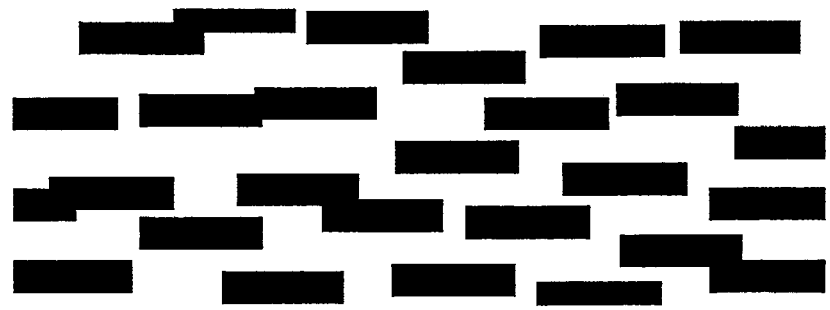
Figure 5C:

By forming and disposing the dots in the manner described above, appropriate distance can be ensured between the adjacent dots, whereby the inter-dot overlap can be prevented. In more concrete, when radial distribution function G(R) is substantially equal to zero within the range where R<Ly, the inter-dot overlap can be prevented perfectly. Additionally, by forming and disposing the dots such that the first peak 8 of the radial distribution function G(R) makes appearance within the range of the distance R represented by Lx>R >Ly with the second peak 9 of the radial distribution function G(R) appearing within the range represented by R>Lx, the dots can be disposed with appropriate or proper distances independently in the vertical direction and the horizontal direction, respectively, relative to the light source, as shown in FIG. 5A. When the radial distribution function G(R) has a single peak at a position not greater than the dot width Lx and not smaller than the dot width Ly, inter-dot overlap will occur, as shown in FIG. 5B, providing a cause for the dot visibility. Further, when the radial distribution function G(R) has a single peak at a position within a range where R>Lx, the inter-dot distance becomes unnecessarily large as illustrated in FIG. 5C. The dot density will then become too low to ensure sufficient dot density.

Furthermore, in respect to the dot size, at least 80% of the dots should preferably be so formed as to meet the conditions that 0.05 mm<Lx<1.0 mm and that 0.03 mm<Ly<0.09 mm. More preferably, at least 80% of the dots should be so formed as to meet the conditions that 0.1 mm<Lx<0.3 mm and that 0.03 mm<Ly<0.09 mm. When the dot size exceeds the values mentioned above, then there will arise the problem of dot visibility. On the other hand, in case the dot size is short of the values mentioned above, fabrication of the backlighting unit and hence manufacturing of the liquid crystal display device will encounter difficulty because the molding process becomes difficult due to an excessively increased number of the dots.

Furthermore, it is to be noted that in conjunction with the dot size described hereinbefore concerning the feature or aspect (1), (2) and/or (3) of the invention, when a liquid crystal display device has a diagonal length greater than 20 cm and the planar shape of the dot is circular or square or the like, as is illustrated in FIG. 12A, the area of the dot should preferably be so selected that it is not smaller than 0.0001 mm$^2$ and not greater than 0.09 mm$^2$. When the dot size exceeds the values mentioned above, then there will arise the problem of dot visibility. On the other hand, in case the dot size is short of the values mentioned above, fabrication of the backlighting unit and hence manufacturing of the liquid crystal display device will encounter difficulty because the die casting or molding process becomes difficult due to an excessively increased number of the dots.

More preferably, in conjunction with the aspect or feature (1) of the invention, the dots should be so formed and disposed that the value of the radial distribution function G(R) becomes substantially zero in the range where the distance R is smaller than the dot diameter. By virtue of this arrangement, the inter-dot overlap can be suppressed completely, whereby the operation efficiency or performance of the light guide plate can be enhanced.

Next, a method of determining the coordinates of the dots will be described in detail.

As the method of forming the dots at random disposition, it may be conceived a method of determining the coordinates of the dots manually on a dot-by-dot basis. However, because of necessity for forming a large number of dots, inter-dot overlap and unevenness of the random dot disposition will likely to occur, and correction of such inter-dot overlap and the unevenness of the dots distribution require time-consuming and troublesome procedure. Under the circumstances, as a method of determining the coordinates (x, y) of the dots disposed at random without regularity, there is proposed according to the present invention a high-efficiency dot coordinates determining method which includes the steps or procedures described below.

Procedure (1)

Random number are generated by making use of random number generating function incorporated in a computer or the like, and the random number as generated are used to determine the coordinates (x, y) for the random dot disposition.

Procedure (2)

Straight lines or curves having equi-distance or regularly increasing distance therebetween are depicted in the x- and y-directions, respectively, whereon intersections among the straight lines or the curves are defined as lattice points (X0, Y0), respectively, whereon the random number (xr, yr) generated by the random number generator are added to the lattice points as deviations or displacements thereof for determining the coordinates (x, y) for the dots to be disposed at random. Thus, according to this method, the coordinates (x, y) for the dot can be given by the following expressions:

$$x=X0+xr$$

$$y=X0+yr.$$

Procedure (3)

The coordinates for a relatively small number of dots are previously defined as a dot group, and the dots belonging to the dot group are disposed on a surface of an optical member (inclusive of a light guide plate). In more concrete, the coordinates representing the dots belonging to the dot group mentioned above, e.g. the center coordinates of the dots, are determined on the basis of the random number generated by the random number generator, whereon the dots belonging to the dot group are disposed at the coordinates as determined.

Procedure (4)

The whole surface in which the dots are to be formed is divided into subregions (also referred to as the cells) and the dot disposition in each of the cells is determined in accordance with the procedures (1) and (2) mentioned above, whereon the cells having the dots disposed are intercon-nected to one another for thereby determining the coordinates (x, y) of all the dots for the random dot disposition.

Procedure (5)

After determination of the coordinates for the dot disposition or in the course of determining the coordinates in accordance with the procedure (1), only the dot coordinates at which inter-dot overlap or extremely close proximity takes place are deleted in order to prevent the inter-dot overlapping or abnormal inter-dot proximity, and thereafter the deleted dot coordinates are again determined by using newly generated random number. Hereinafter, this method will be referred to as the dot overlap suppressing processing.

Procedure (6)

There may also be conceived a procedure corresponding to a combination of the procedures (1), (4) and (5) mentioned above. Namely, the cells are established and the dot disposition in each of these cells is determined in accordance with the procedures (1) and (5), whereon the cells having the dots disposed are interconnected to one another for thereby determining the coordinates of all the dots. In that case, the above-mentioned dot overlap suppressing processing should be performed not only for these cells but also for the cells located adjacent thereto.

Procedure (7)

The dot-formed surface is divided into the cells by resorting to the procedure (6) when it is convenient to increase or decrease the dot density regularly or irregularly in dependence on the locations of the dots in order to partially vary or uniformize the luminance distribution.

The procedures described above or combination(s) thereof represents a method for carrying out the present invention.

Now, exemplary embodiments of the invention will be described in more concrete.

In the first place, description will be directed to a method of generating the coordinates for the dot disposition which meets the requirement or requirements mentioned hereinbefore in conjunction with aspects (1) to (8) of the invention.

Figure 6A:
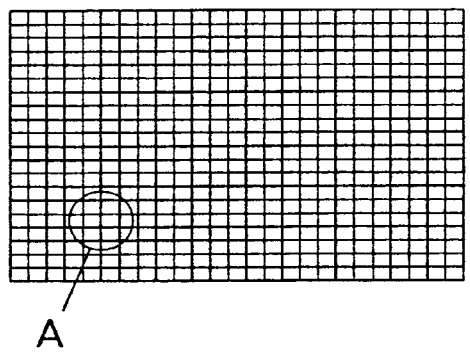
FIG. 6A is a view for illustrating, by way of example, division of a dot-formed surface into square regions of 1 to 4 mm$^2$.
Figure 6B:
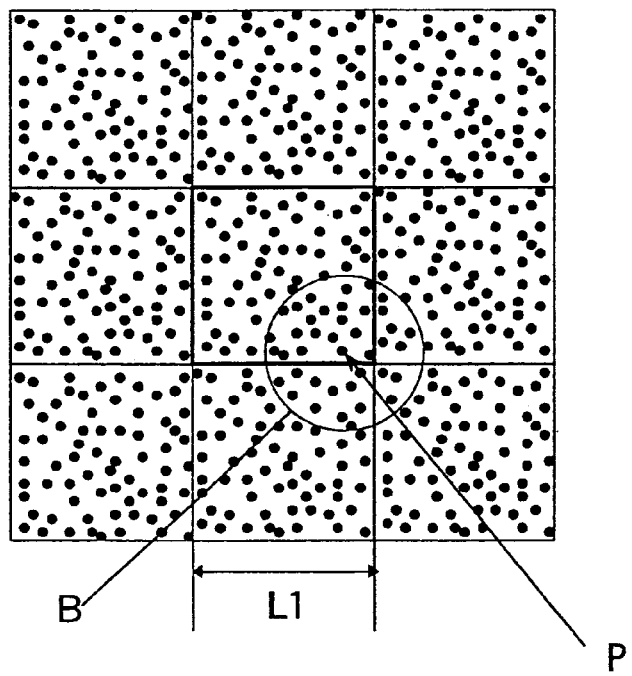
Figure 7:
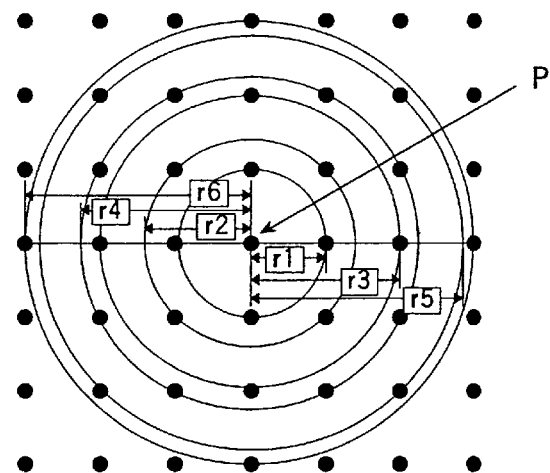
FIG. 7 is a schematic diagram for illustrating a method of determining values of radial distribution function g(R) for a given one of the dots.
Figure 8A:
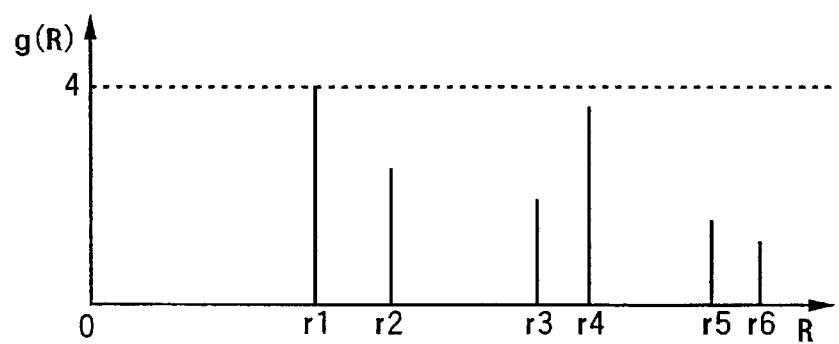
FIG. 8A is a view for graphically illustrating the radial distribution functions g(R) for a regular dot pattern.
Figure 8B:
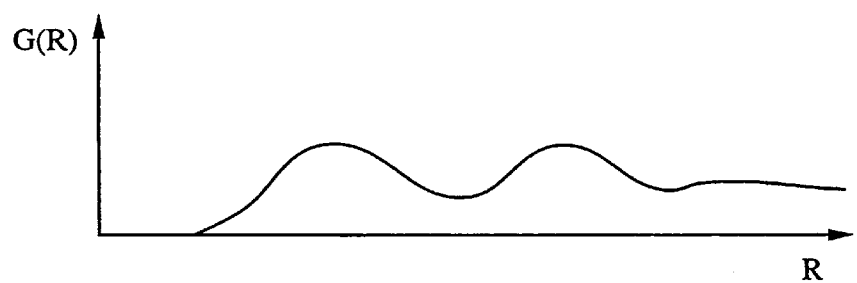
FIG. 8B is a view for graphically illustrating radial distribution functions g(R) for a random dot disposition pattern.
Figure 9A:
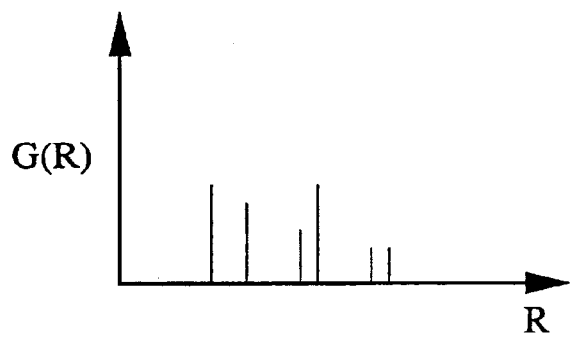
FIG. 9A is a view for graphically illustrating radial distribution functions G(R) determined on the basis of the radial distribution functions g(R) in the case where the dots are regularly disposed.
Figure 9B:
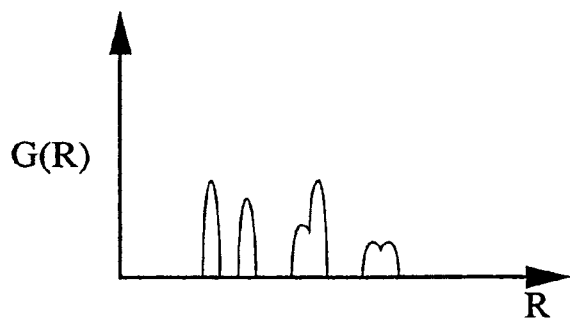
FIG. 9B is a view for graphically illustrating radial distribution functions G(R) in the case where a regular dot pattern is added with some randomness.
Figure 9C:
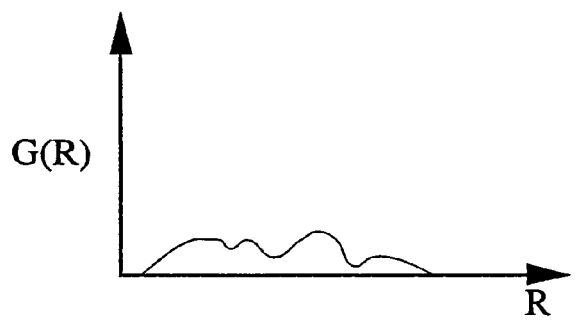
FIG. 9C is a view for graphically illustrating radial distribution functions G(R) in the case where the dots are disposed significantly randomly with some regularity being still maintained.
Figure 9D:
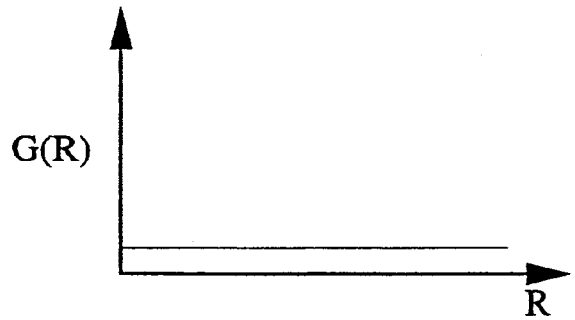
FIG. 9D is a view for graphically illustrating radial distribution functions G(R) in the case where the dots are disposed quite randomly.
Figure 10A:
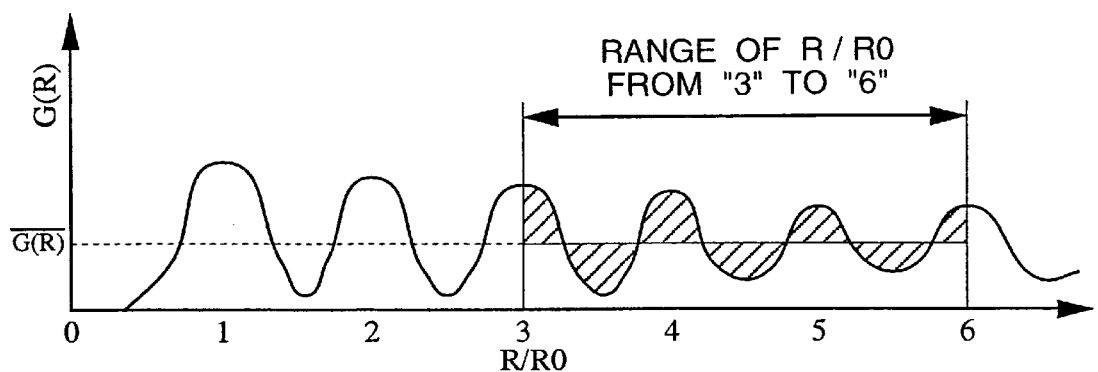
FIGS. 10A and 10B are views for graphically illustrating integrated values S1 and S2 for radial distribution functions G(R), respectively.
Figure 10B:
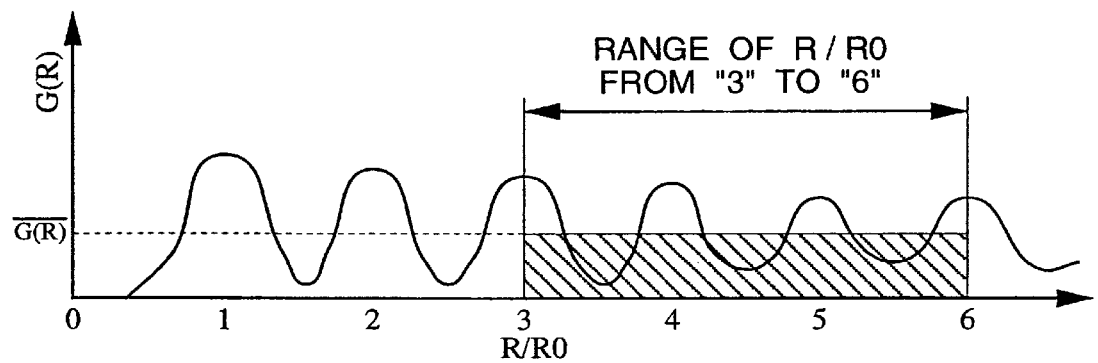
Figure 11:
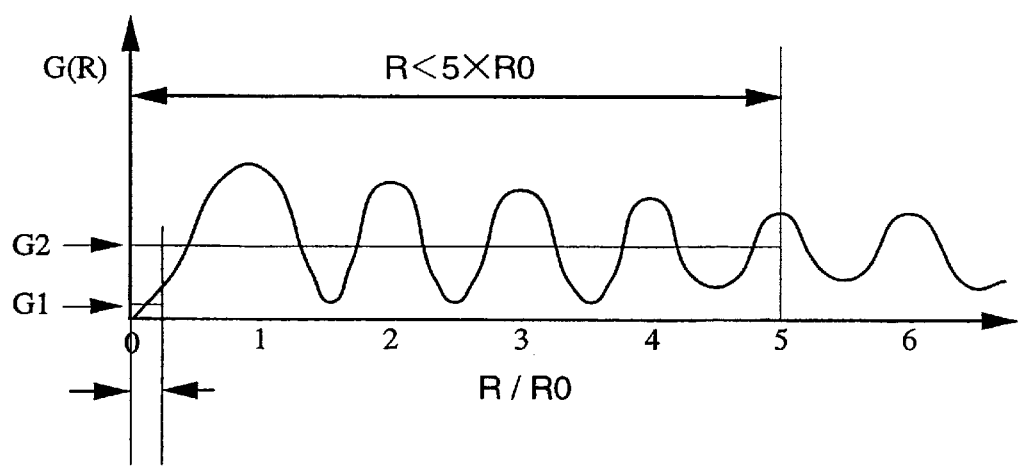
FIG. 11 is a view for graphically illustrating mean values G1 and G2 relative to values of the radial distribution function G(R) on the assumption that r=R0/4.

FIG. 6A is a schematic view showing a dot-formed surface of a light guide plate employed in a backlighting unit of the liquid crystal display device according to the instant embodiment of the invention, and FIG. 6B is an enlarged view showing a portion of the dot-formed surface. Referring to the figures, the circular dots having a mean diameter of 50 m are disposed with a mean lattice distance of 100 $\mu$m. The values of the coordinates (x, y) which determine the disposition of the dots (i.e., dot positions) are determined by making use of random numbers, whereon dot overlap suppressing processing is performed.

More specifically, in the case where 10,000 dots are to be formed in a square region of 1 cm$^2$ with the lattice distance (i.e., inter-dot distance) of 100 m, two sets of random number each of four digits are generated 10,000 times with the aid of a computer, and one set of random numbers are used as the x-coordinate values with the other set of random numbers being used as the y-coordinate values to thereby define the dot positions. When the dots are formed in this manner, there may arise such situation that the dots overlap each other and in an extreme case, several ones of the dots are formed continuously to thereby form one dot of large size. Accordingly, when the optical member having such dot-formed surface is employed in the liquid crystal display device, the dot visibility problem may arise. Parenthetically, with the phrase "optical member", it is contemplated to encompass the light guide plate as well.

For coping with the above problem, the dot overlap suppressing processing is performed. To this end, the coordinates data obtained in the computation of the dot coordinates are stored in the memory, and upon subsequent computation of the dot coordinates, the coordinates data as obtained are compared with the preceding coordinates data. When the comparison indicates that the dot coordinates determined currently are located excessively closely to those determined previously, random number are again generated to determine newly the dot coordinates. In this conjunction, it should be mentioned that the distance between the centers of adjacent dots ordinarily lies within the range of 1d to 2d where d represents the diameter of the dot. However, the inter-dot distance is never limited to the above value but may be selected properly in consideration of the dot size as well as the dot density. By adopting the method described above, the inter-dot overlap and extreme proximity between the dots can be prevented or suppressed effectively.

Figure 15A:
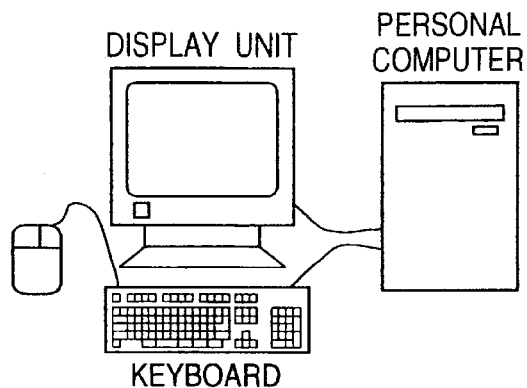
FIG. 15A is a diagram showing only schematically and exemplarily a system for generating data used for forming random dot disposition patterns.

FIG. 15A is a diagram showing a system for executing the dot disposition determining method described above. The system is comprised of a main body of a personal computer, a display unit and a keyboard. By generating the random numbers with the aid of the personal computer, the coordinates of the individual dots are determined.

Figure 15B:
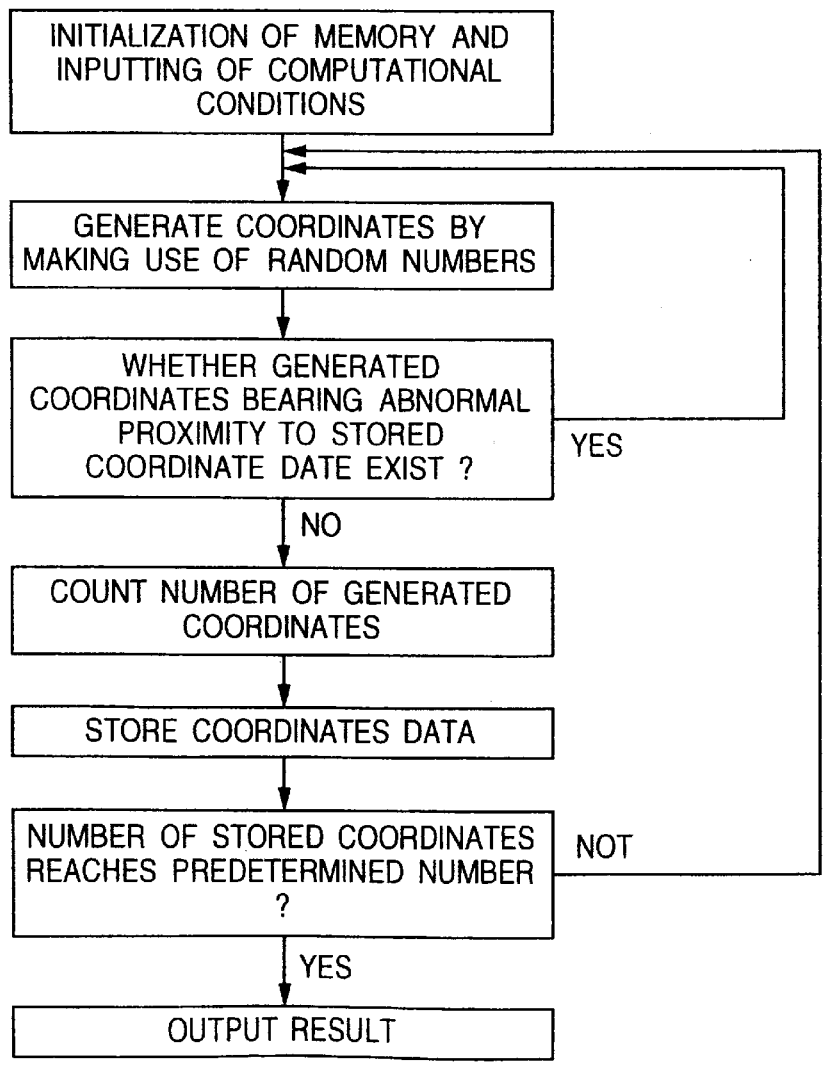
FIG. 15B is a flow chart for illustrating operation of the system shown in FIG. 15A.

FIG. 15B is a flow chart for illustrating operation of the above-mentioned system. Every times the coordinates for the dots are to be determined by using random number, it is checked whether or not there exist those dots which overlap each other or which are located abnormally closely to the dots at the coordinates already determined. Unless the overlap or closely located dots are present, the coordinates therefor are established. If otherwise, the dot coordinates are canceled and random numbers are again generated. This process is repeated.

Figure 16A:
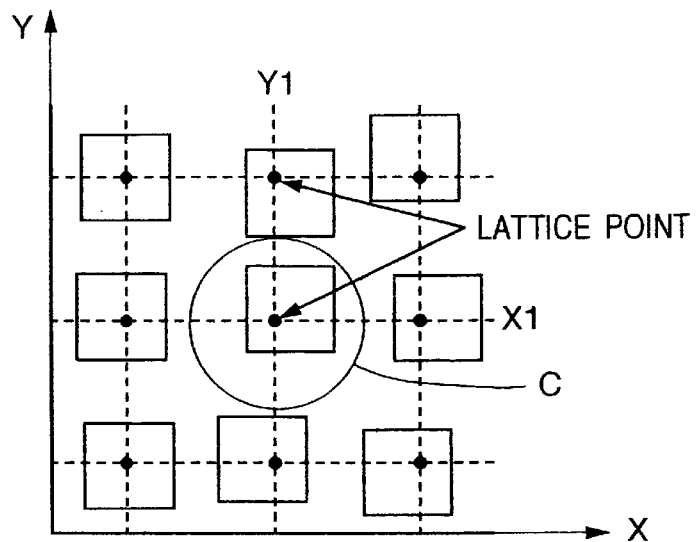
FIGS. 16A and 16B are schematic diagrams for illustrating an exemplary method of determining a random dot disposition pattern in the liquid crystal display device according to the first embodiment of the invention.
Figure 16B:
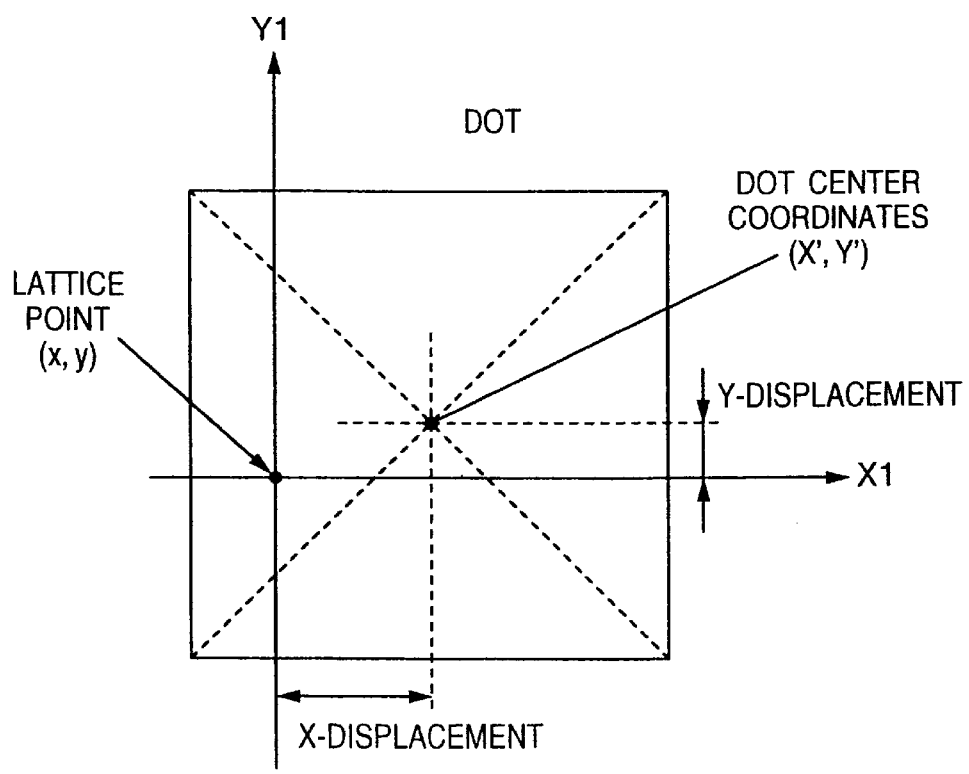

FIG. 16A and 16B are schematic diagrams for illustrating an exemplary method of determining the coordinates for the random dot disposition. Referring to FIG. 16A, lattice points arrayed regularly are set as the positions for disposition of the dots. Subsequently, positional deviations or displacements in the x-and y-direction from a given lattice point (x, y) are determined at random by using random number, as illustrated in FIG. 16B which shows in an enlarged view a portion indicated as enclosed by a circle C shown in FIG. 16A, to thereby establish the dot position at the coordinates (X', Y') displaced from the lattice point (x, y) by the x- and y-directions mentioned above. Parenthetically, with the terms "dot position" or "position of the dot", it is contemplated to mean the center position of the dot. In FIG. 16A, each of the dots disposed at random is shown in the form of square. Thus, this method is effective for preventing the interdot overlap in advance. In general, according to the dot position determining method taught by the invention, the dots are disposed preparatorily at the lattice points, respectively, and the deviations of the dot in the x- and y-direction (i.e., distances for which the dot is to be deviated from the original lattice point in the x- and y-direction, respectively) are defined as displacements in the x- and y-direction, respectively, whereon the displacements are determined by using random numbers. The x- and y-displacements can be determined in accordance with the following expressions.

x-displacement={residue resulting from division of integral random number of at least four digits by (maximum value of displacement×2+1)}−maximum value of displacement, and y-displacement={residue resulting from division of integral random number of at least four digits by (maximum value of displacement×2+1)}−maximum value of displacement.

In the random dot disposition illustrated in FIG. 16B, the dot center coordinates (X', Y') can be given by the following expressions:

$X'=X1+x$-displacement $Y'=Y2+y$-displacement

At this junction, the maximum value of the displacement can be selected in dependence on intended applications. Further, it is noted that the randomness becomes more significant as the maximum value of the displacement becomes greater. In that case, however, since likelihood of occurrence of the overlap increases, some measures for preventing the overlap will be required. In the following, a typical computational method for determining the x-displacement (i.e., displacement of the dot in the x-direction) will be described on the assumption that the maximum value of the displacement is 50 $\mu$m, only by way of example.

At first, a random number of more than four digits is generated. Let's suppose, by way of example, that "28469" is generated. On the assumption mentioned above, "maximum value of displacement×2+1" is equal to "101". Thus, by dividing "28469" by "101", the residue of "88" is obtained. Consequently, the x-displacement is 33 $\mu$m (=88−50).

Figure 17:
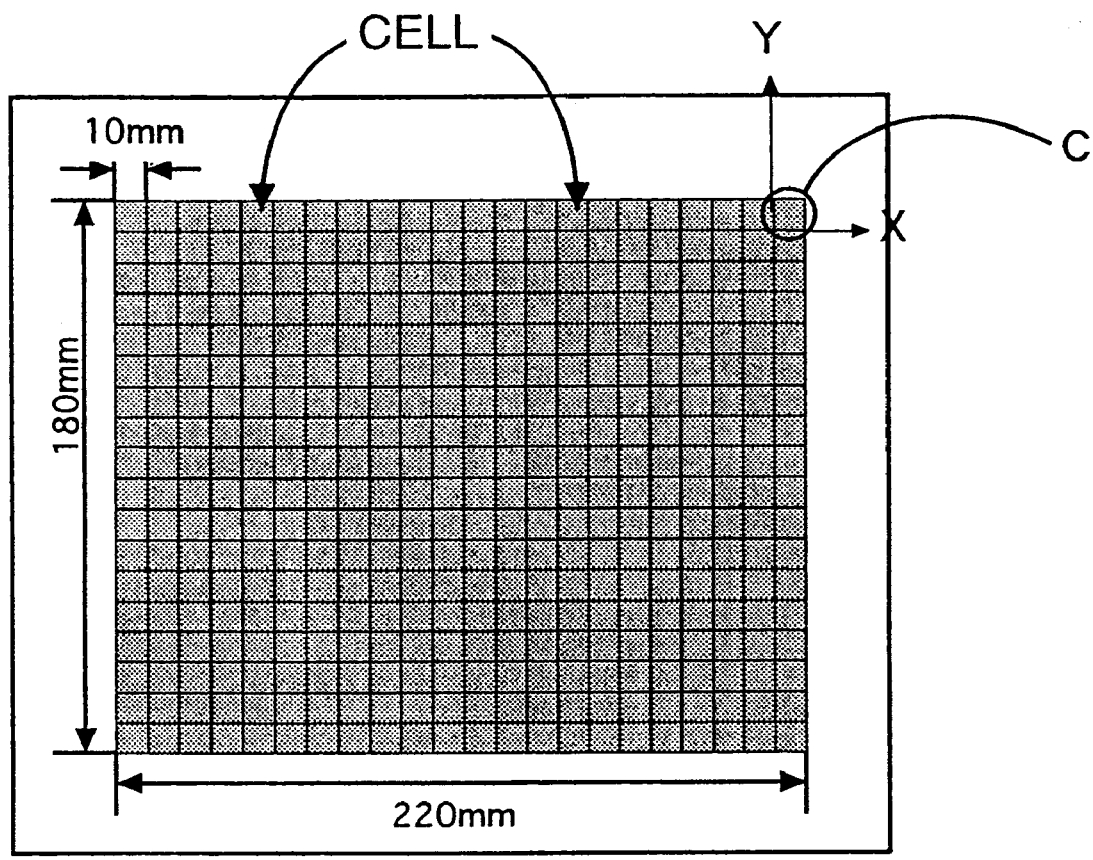
FIG. 17 is a view showing a dot-formed surface divided into square regions or cells in the liquid crystal display device according to the first embodiment of the invention.
Figure 18A:
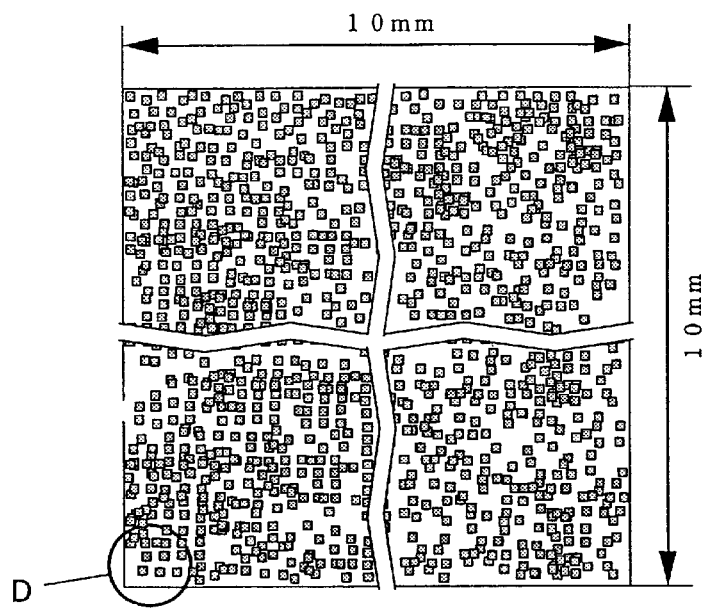
FIG. 18A is an enlarged view showing a dot disposition in a cell C shown in FIG. 17.

FIG. 17 is a view showing a dot-formed surface of 220 mm×180 mm divided into square regions or cells of 10 mm×10 mm, and FIG. 18A is an enlarged view showing a region or cell C shown in FIG. 17. Further, FIG. 18B is an enlarged view showing a region D shown in FIG. 18A.

Figure 18B:
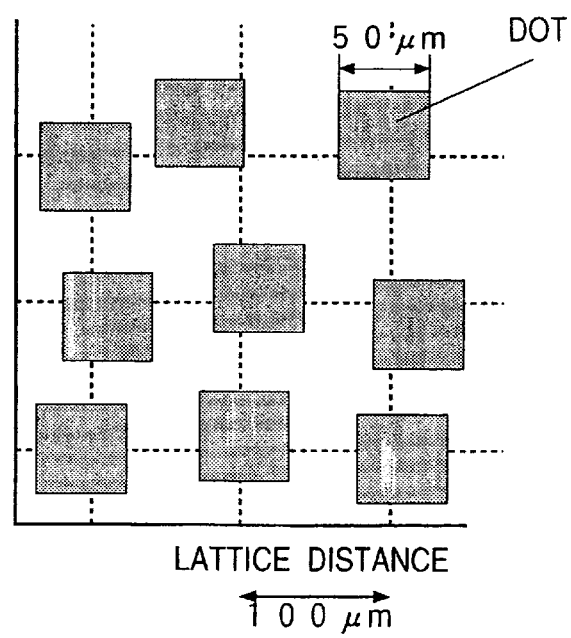
FIG. 18B is an enlarged view showing a dot disposition in a region D shown in FIG. 18A.

Referring to FIG. 18B, it is assumed that square dots each having a side length of 50 $\mu$m are disposed at random with the lattice distance (i.e., distance between adjacent lattice points) of 100 $\mu$m. The dots are disposed at random in each of the cells in accordance with the procedures mentioned previously. Subsequently, the individual cells are interconnected to thereby determine the dot coordinates (x, y) for the whole dot-formed surface.

This dot forming method is advantageous in that because the number of the dots in each of the cells is constant for all the cells, there can be realized the dot disposition of a uniform density.

Next, description will be made of a method for generating dot center coordinates for realizing the dot disposition which meets the requirement mentioned hereinbefore in conjunction with the aspect or feature (5), i.e., the dot disposition according to the aspect (1) of the invention, wherein the dots are so formed and disposed that the radial distribution function G(R) is substantially equal to zero in the range of R which is smaller than the dot width Ly and that a first peak 8 of the radial distribution function G(R) exists within the range of the distance R represented by Lx>R>Ly with a second peak 9 of the radial distribution function G(R) lying within the range represented by R>Lx, as illustrated in FIG. 14.

In the first place, constants KS1 and KS2 which satisfy the conditions that Ly<KS1<Lx and that Lx<K2, respectively, are defined in consideration of the dot size and the dot density. Subsequently, it is checked whether both conditions that horizontal component of the inter-dot distance relative to the light source is smaller than the constant KS2 and that vertical component of the inter-dot distance relative to the light source is smaller than the constant KS1 are satisfied or not. When both the conditions mentioned just above, the dots are considered to have abnormal proximity, and the dot overlap suppressing processing is performed.

The following table (1) shows in summarization results of examination of dot dispositions conforming to the one shown in FIG. 18, having a dot density of 10,000/cm² and formed in accordance with the procedure (2) described hereinbefore while varying the maximum value of the displacement and other influential parameters.

the inter-dot overlap but also the dot visibility increases. By performing the dot overlap suppressing processing, there can be obtained the dot disposition pattern suffering no dot visibility problem.

TABLE I

RESULTS OF EXAMINATION CONCERNING DOT DISPOSITIONS

| ITEMS | LATTICE-POINT-REFERENCED, RANDOM-NUMBER-BASED DOT DISPOSITION (PROCEDURE 2)* | | | | | | | |
|---|---|---|---|---|---|---|---|---|
| MAXIMUM VALUE OF DISPLACEMENT | 5 μm | 10 μm | 20 μm | 30 μm | 50 μm | 80 μm | 100 μm | 100 μm |
| INTER-DOT OVERLAP SUPPRESSION | NOT EFFECTED | NOT EFFECTED | NOT EFFECTED | NOT EFFECTED | NOT EFFECTED | NOT EFFECTED | NOT EFFECTED | EFFECTED |
| S1/S2 | 0.8 | 0.5 | 0.22 | 0.09 | 0.012 | 0.015 | 0.011 | 0.013 |
| G1/G2 | 0 | 0 | 0 | 0 | 0.25 | 0.82 | 0.89 | 0 |
| MOIRÉ | x | x | o | o | ⊚ | ⊚ | ⊚ | ⊚ |
| INTER-DOT OVERLAP | ⊚ | ⊚ | ⊚ | ⊚ | o | o | o | ⊚ |
| DOT VISIBILITY | ⊚ | ⊚ | ⊚ | ⊚ | o | o | o | ⊚ |
| GLOBAL EVALUATION | x | x | o | o | o | o | o | ⊚ |

Figure 19:
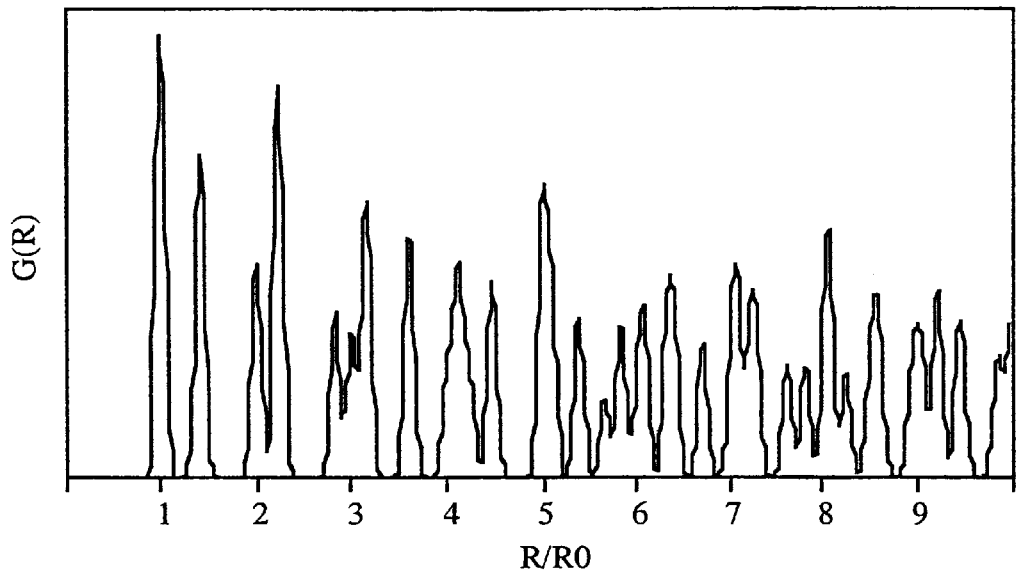
FIG. 19 is a view for graphically illustrating values of radial distribution functions G(R) in the case where the maximum value of displacement of the dots from relevant lattice points in a regular lattice pattern is 5 μm.
Figure 20:
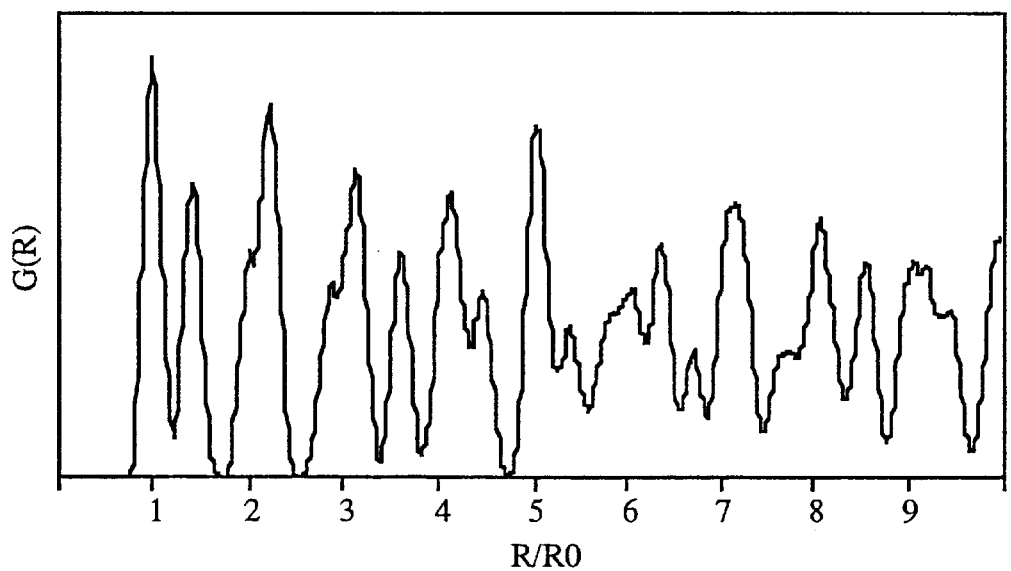
FIG. 20 is a view for graphically illustrating values of radial distribution functions G(R) in the case where the maximum value of displacement of the dots from relevant lattice points in a regular lattice pattern is 10 μm.

*mean inter-dot distance of 100 μm with dot size of 50 μm
⊚: satisfactory
o: passable
x: unacceptable When the maximum value of the displacement of the dot from the lattice point is less than 10 μm, high periodicity is observed in the radial distribution function G(R) as can be seen in FIG. 19 (maximum value of the displacement=5 μm) and in FIG. 20 (maximum value of the displacement=10 μm). Thus, interference takes place between the dot disposition pattern and the regular TFT pattern or the regular color filter pattern of the liquid crystal display device, giving rise to moiré such as shown in FIG. 2.

Figure 21:
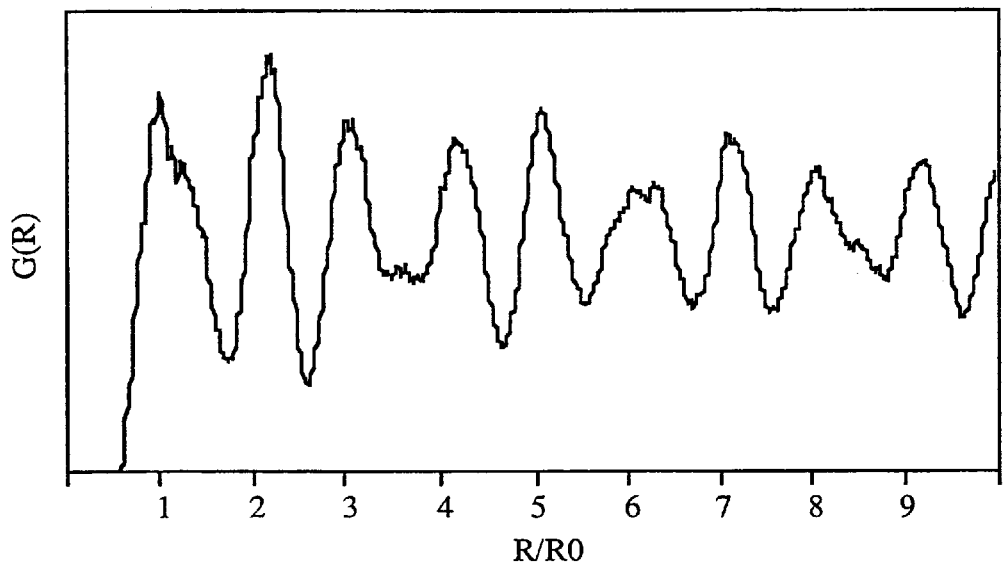
FIG. 21 is a view for graphically illustrating values of radial distribution functions G(R) in the case where the maximum value of displacement of the dots from relevant lattice points in a regular lattice pattern is 20 μm.
Figure 22:
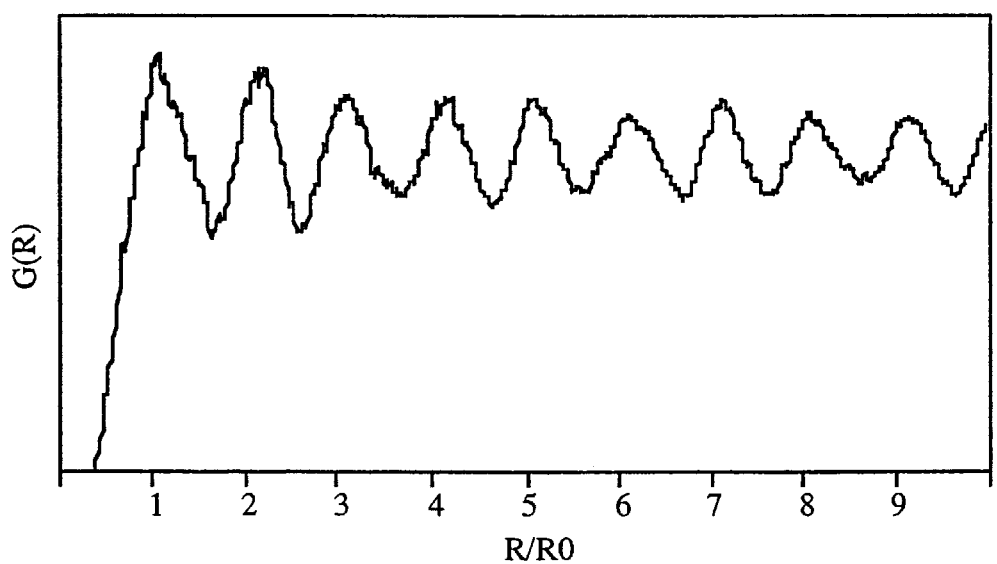
FIG. 22 is a view for graphically illustrating values of radial distribution functions G(R) in the case where the maximum value of displacement of the dots from relevant lattice points in a regular lattice pattern is 30 μm.

By contrast, in case the maximum value of the displacement of the dot from the lattice point is 20 μm (FIG. 21) or 30 μm (FIG. 22), occurrence of moiré can be suppressed to some extent even though periodicity can still be observed in the radial distribution function G(R). Additionally, in these cases, the problems of inter-dot overlap and dot visibility problem can be overcome satisfactorily.

Figure 23:
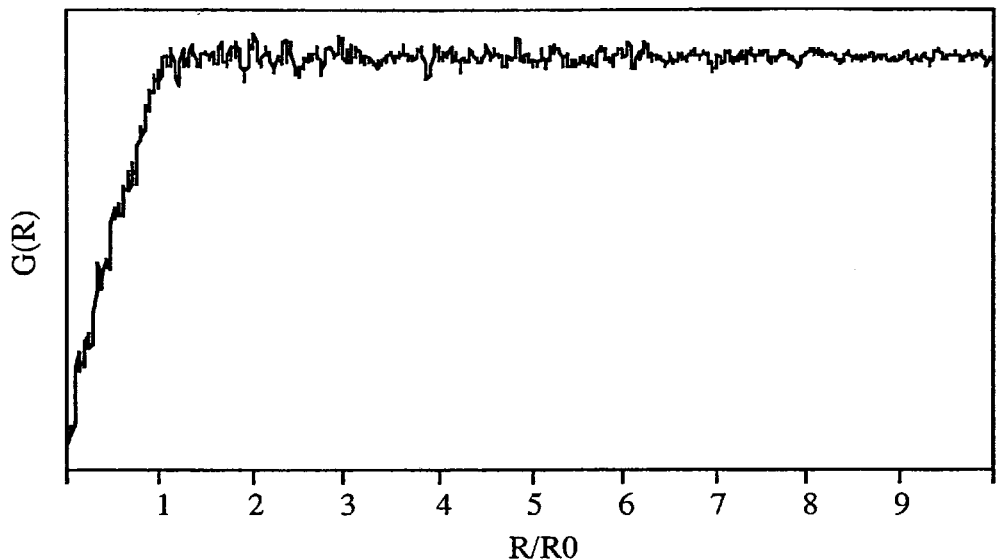
FIG. 23 is a view for graphically illustrating values of radial distribution functions G(R) in the case where the maximum value of displacement of the dots from relevant lattice points in a regular lattice pattern is 50 μm.
Figure 24:
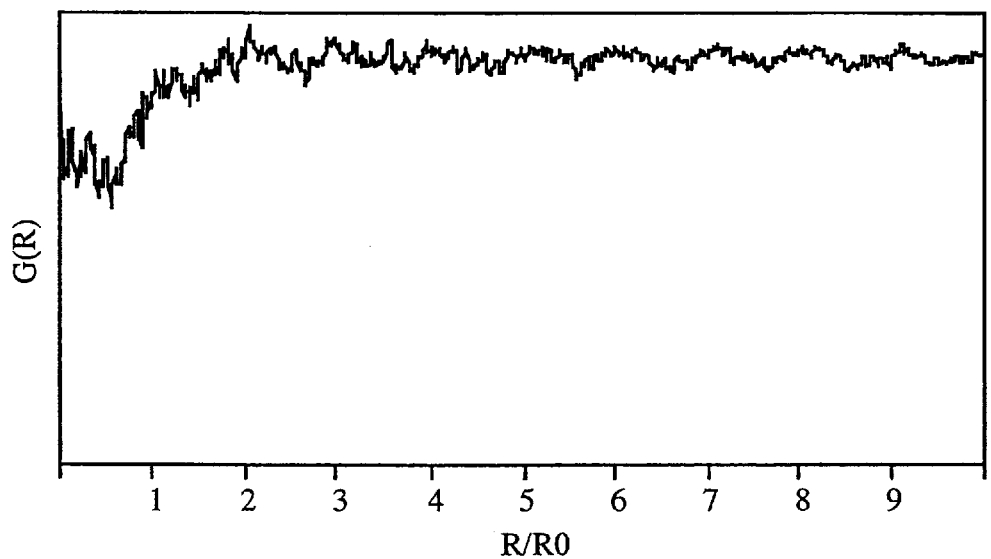
FIG. 24 is a view for graphically illustrating values of radial distribution functions G(R) in the case where the maximum value of displacement of the dots from relevant lattice points in a regular lattice pattern is 80 μm.
Figure 25:
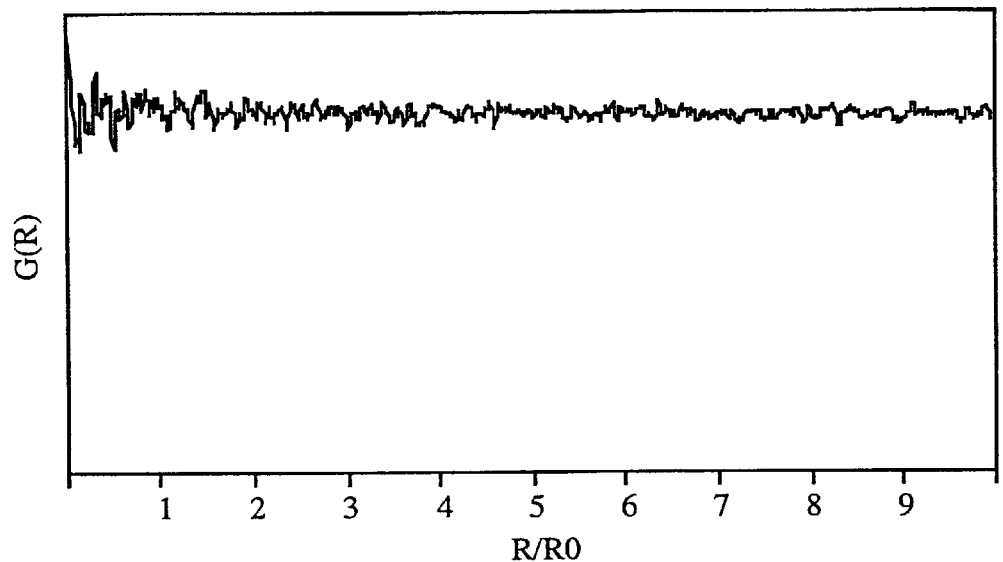
FIG. 25 is a view for graphically illustrating values of radial distribution functions G(R) in the case where the maximum value of displacement of the dots from relevant lattice points in a regular lattice pattern is 100 μm and where the dot overlap suppressing processing is not effected.
Figure 26:
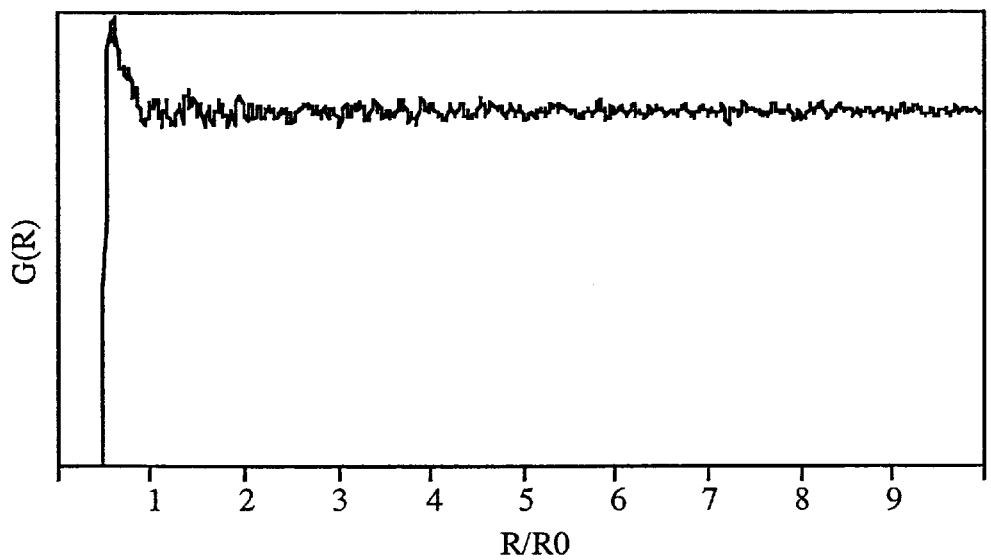
FIG. 26 is a view for graphically illustrating values of radial distribution functions G(R) in the case where the maximum value of displacement of the dots from relevant lattice points in a regular lattice pattern is 100 μm and where the dot overlap suppressing processing is effected.

When the maximum value of the displacement of the dot from the lattice point is 50 μm (FIG. 23), 80 μm (FIG. 24) or 100 μm (FIG. 25), the radial distribution function G(R) exhibits substantially no periodicity. Consequently, occurrence of moiré can be suppressed substantially completely. However, in case the maximum value of the above-mentioned displacement exceeds 50 μm, probability of occurrence of the inter-dot overlap increases, giving rise to the problem of dot visibility, even though occurrence of moiré can be suppressed. In that case, the dot overlap suppressing processing is performed, to thereby suppress the inter-dot overlap while ensuring non-periodicity of the radial distribution function G(R). A first dot proximity peak making appearance when R/R0=1/2 provides no cause for the moiré. In this way, there can be realized the dot disposition which can suffer neither the moiré nor the dot visibility problem.

The following table II shows results of examination of the dot disposition shown in FIGS. 18A and 18B realized in accordance with the procedure (1) mentioned hereinbefore, i.e., absolute random-number dot disposition method according to which all the dots are disposed solely by making use of random number generated by a random number generator. In this case, unless the dot overlap suppressing processing is performed, probability of not only

TABLE II

RESULTS OF EXAMINATION CONCERNING DOT DISPOSITIONS

| ITEMS | ABSOLUTE RANDOM-NUMBER-BASED DOT DISPOSITION (PROCEDURE 1)*1 | | | | | |
|---|---|---|---|---|---|---|
| INTER-DOT OVERLAP SUPPRESSION*2 | NOT EFFECTED | 2 μm | 10 μm | 25 μm | 40 μm | 50 μm |
| G1/G2 | 1 | 0.95 | 0.8 | 0.6 | 0.3 | 0 |
| MOIRÉ | ⊚ | ⊚ | ⊚ | ⊚ | ⊚ | ⊚ |
| INTER-DOT OVERLAP | x | x | o | o | o | ⊚ |
| DOT VISIBILITY | o | o | o | o | o | ⊚ |
| GLOBAL EVALUATION | x | x | o | o | o | ⊚ |

*1mean inter-dot distance of 100 μm with dot size of 50 μm
⊚: satisfactory
o: passable
x: unacceptable
*2inter-dot distance ensured by dot overlap suppressing processing Next, description will be made of a backlighting unit according to an embodiment of the invention to which the optical member inclusive of the light guide plate provided with the dot disposition described above can find application.

Figure 27A:
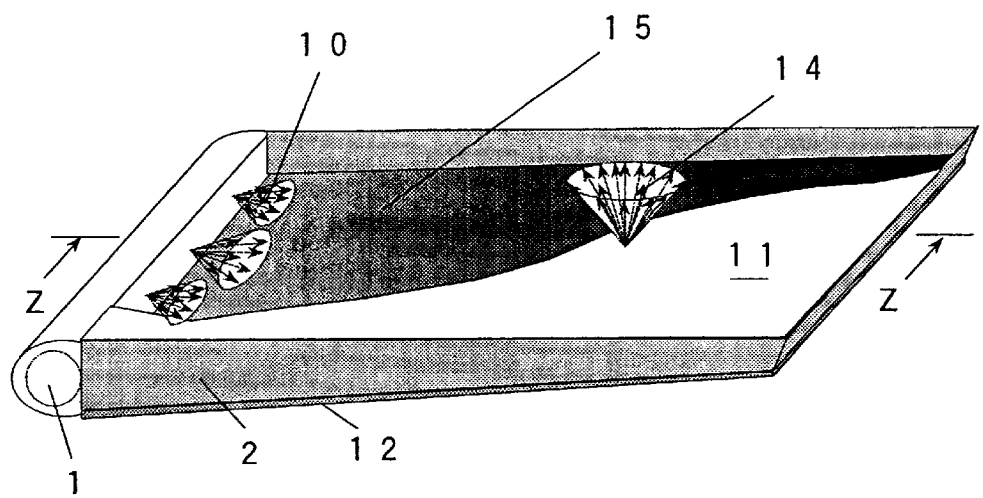
FIG. 27A is a perspective view showing a backlighting unit according to an embodiment of the present invention.
Figure 27B:
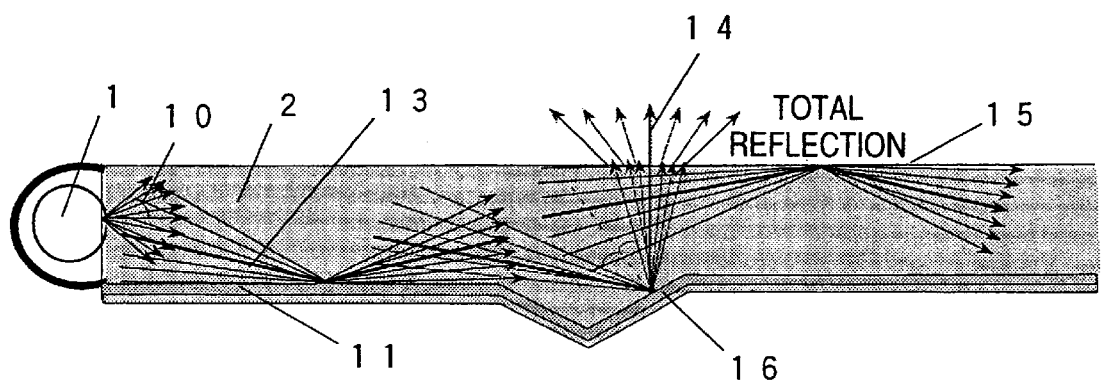
FIG. 27B is a sectional view taken along line Z—Z in FIG. 27A.

FIGS. 27A and 27B show an exemplary embodiment of the backlighting unit according to the present invention, wherein FIG. 27A is a perspective view showing the same as a whole and FIG. 27B is a sectional view taken along arrowed line Z—Z in FIG. 27A. In the figures, reference numeral 1 denotes a light source, 10 designates incident light rays, 11 denotes a film (or plate), 12 denotes a bottom surface of the light guide plate, 13 designates traveling light rays, 14 designates exit light rays, 15 denotes a light-transmissive surface, and 16 denotes small convexes.

Referring to FIGS. 27A and 27B, the bottom surface 12 of the light guide plate 2 is formed with the small convexes 16 each of substantially conical shape, being disposed at random through the procedure(s) mentioned hereinbefore.

Incident lights 10 from the light source 1 impinge on a left-hand end face of the light guide plate 2, as viewed in the figure and travel through the light guide plate 2 as travelling light rays 13 in the direction toward the other end face of the light guide plate 2 while undergoing repetitionally total reflections at the bottom surface 12 of the light guide plate and the light-transmissive surface 15. The traveling light rays 13 incident on slanted surfaces of the small convexes 16 (reflecting slanted portions) are reflected thereon to exit the light guide plate 2 through the light-transmissive surface 15 while undergoing refraction. The exit light rays 14 enters the liquid crystal display device (not shown).

By disposing the small convexes 16 on the bottom surface 12 of the light guide plate 2 in a proper pattern, the traveling light rays 13 are caused to exit sequentially and gradually the light guide plate 2 for lighting the liquid crystal display device. By virtue of the structure of the light guide plate in which the small convexes are formed at random position, as mentioned above, distribution of exit angles of the light rays can easily be controlled while evading occurrence of moiré.

In general, luminous intensity within the light guide plate decreases as the distance from the light source increases. Accordingly, the density, the height and the size of the small convex 16 are changed correspondingly as a function of the distance from the light source so that luminance distribution of the light rays reflected at the small convexes 16 becomes uniform, i.e., distribution of luminance becomes uniform over the whole bottom surface of the light guide plate. To this end, the small convexes 16 or the dots should be so formed or disposed that the density thereof increases from the end face of the light guide plate at which the light source is disposed toward the other opposite end face thereof.

As a method of forming the dots as mentioned above, it is proposed to divide the bottom surface of the light guide plate into e.g. sixteen rectangular regions, determine previously the dot density properly for each of the rectangular regions, and dispose at random the predetermined number of dots in each rectangular regions, respectively. To say in another way, the dots are so disposed that the dot density (the number of dots) increases or decreases regularly or irregularly over the whole dot-formed surface when viewed in the light traveling direction and that in each of the divided regions of the dot-formed surface of the light guide plate 2, the dots are disposed by making use of random number. The light guide plate fabricated in this manner scarcely suffers moiré interference and exhibits excellent uniformity concerning the luminance distribution. Incidentally, a method of changing continuously the dot density with the cells being dimensioned in a smaller size is also effective for realizing the dot disposition according to the invention.

Figure 28A:
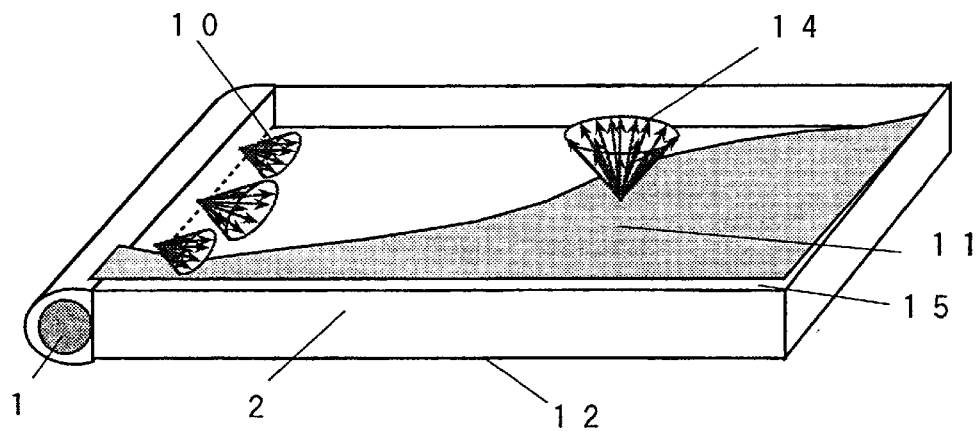
FIG. 28A is a perspective view showing a backlighting unit according to another embodiment of the invention, as viewed obliquely from a top side.
Figure 28B:
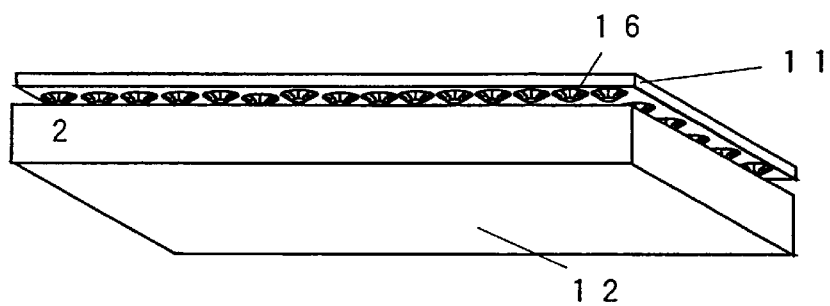
FIG. 28B is a perspective view of the same as viewed obliquely from a bottom side.
Figure 28C:
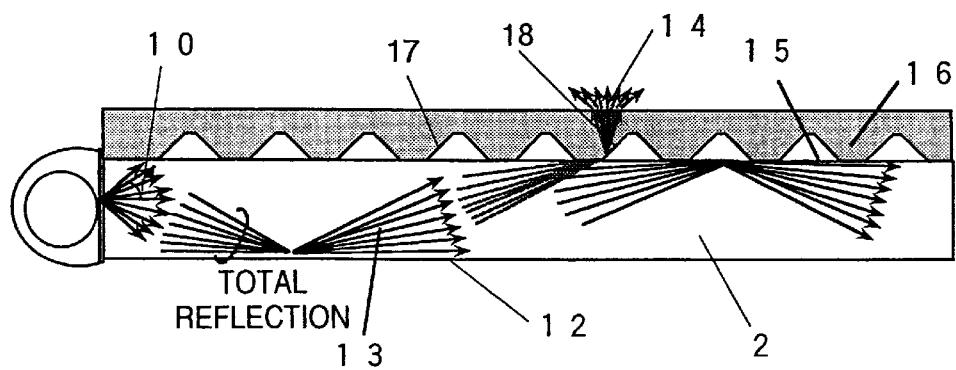
FIG. 28C is a sectional view of the same.

FIGS. 28A to 28C show another exemplary embodiment of the backlighting unit according to the invention, wherein FIG. 28A is a perspective view showing the same as viewed obliquely from the top side, FIG. 28B is a perspective view of the same as viewed obliquely from the bottom side, and FIG. 28C is a sectional view taken along the arrowed line Z—Z in FIG. 28A. In the figures, reference numeral 16 denotes small convexes (dots), and numeral 17 denotes a slanted surface of the dot. Further, in these figures, parts or portions corresponding to those shown in FIGS. 27A to 27C are denoted by like reference numerals, and repeated description thereof will be omitted.

In the backlighting unit shown in FIGS. 28A to 28C, the light source 1, the light guide plate 2, and the film (or plate) 11 represent the smallest unitary components, respectively, wherein the small convexes 16 are formed at random in the surface of the film (or plate) 11 disposed at the side of the light-transmissive surface 15 of the light guide plate, which surface faces oppositely to the light guide plate 2. The light guide plate 2 and the film (or plate) 11 are optically coupled through the medium of planar tip end portions of the small convexes 16.

As can be seen in FIG. 28C, the light rays 10 emitted from the light source 1 impinge on a left-hand end face of the light guide plate 2, as viewed in the figure, and travel through the light guide plate 2 as travelling light rays 13 in the direction toward the other end face of the light guide plate 2 while undergoing repetitionally total reflections at both the bottom surface 12 of the light guide plate and the light-transmissive surface 15. The traveling light rays 13 incident at junctions between the small convexes 16 and the light guide plate 2 are guided and injected into the film (or plate) 11 to be reflected at the side surfaces 18 and leaves the film (or plate) 11 for backlighting the liquid crystal display device (not shown).

By selecting appropriately the size and the density, the small convexes 16 as well as tilt angle of the side surfaces 18, the traveling light rays 13 are caused to leave sequentially and gradually the light guide plate 2 for lighting the liquid crystal display device substantially uniformly from the whole surface of the light-transmissive surface 15 of the light guide plate 2.

By virtue of the structure of the light guide plate in which the small convexes are formed at random position, as mentioned above, distribution of the exit angles of the light rays can easily be controlled while evading occurrence of moiré.

Figure 29A:
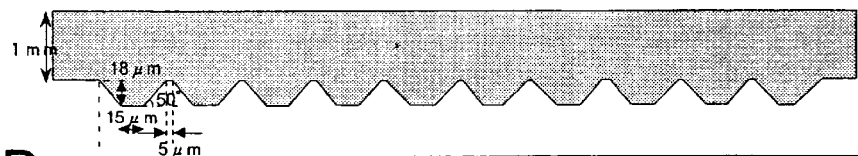
FIGS. 29A to 29D show in plan views and sectional views exemplary light guide plates for a liquid crystal display device fabricated in accordance with a conventional dot forming method and having a regular dot disposition pattern.
Figure 29B:
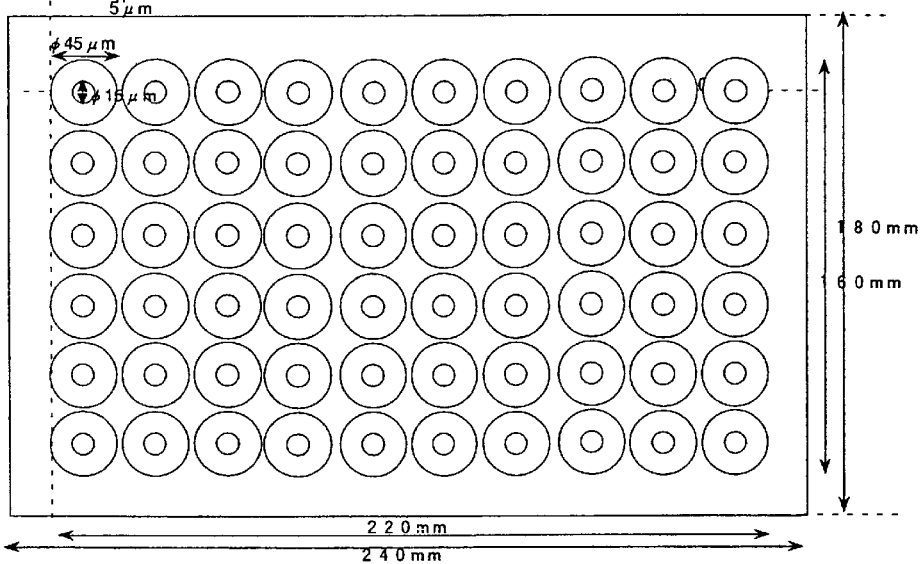
Figure 29C:
Figure 29D:
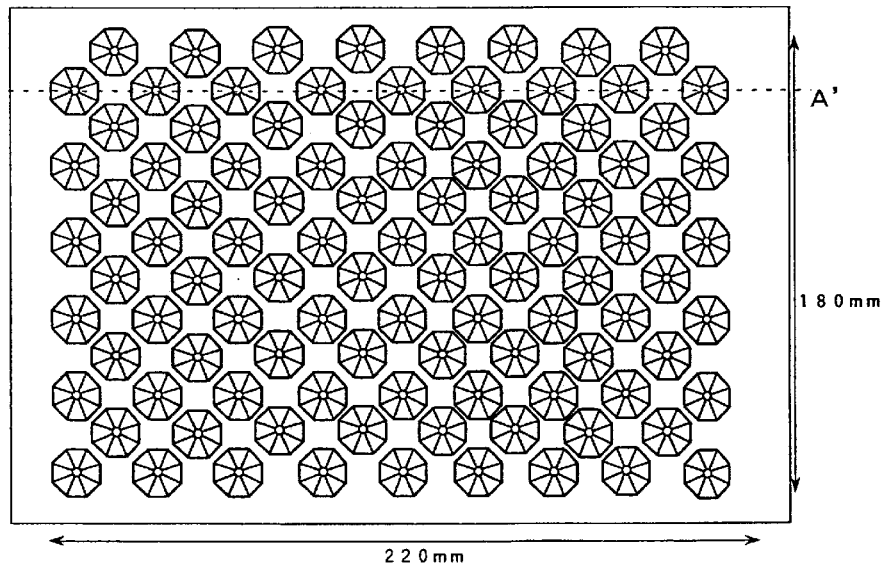

FIGS. 29A to 29D show in plan views and sectional views exemplary ones of the light guide plate 2 fabricated in accordance with a conventional dot forming method known heretofore, wherein FIGS. 29A and 29B show a dot disposition or array in which the individual dots are each formed in a conical shape and disposed regularly, while in the dot array shown in FIGS. 29C and 29D, the dots are formed in an octagonal cone shape. For more particulars, reference should be made to Japanese Unexamined Patent Application Publication No. 67004/1994(JP-A-6-67004). In the dot dispositions mentioned above, moiré phenomenon tends to take place.

Figure 30A:
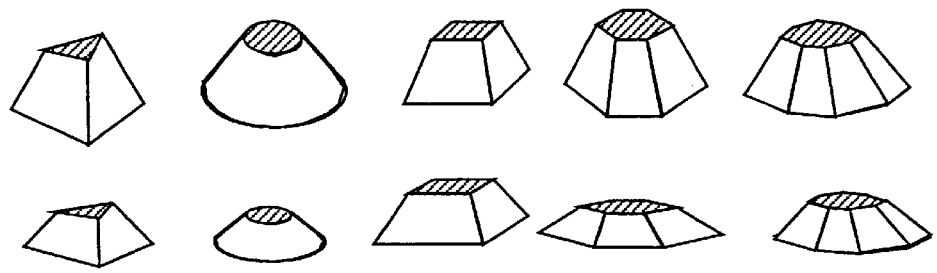
FIGS. 30A and 30B show in perspective and top plan views various polygonal dot shapes which can be adopted in carrying out the present invention.
Figure 30B:
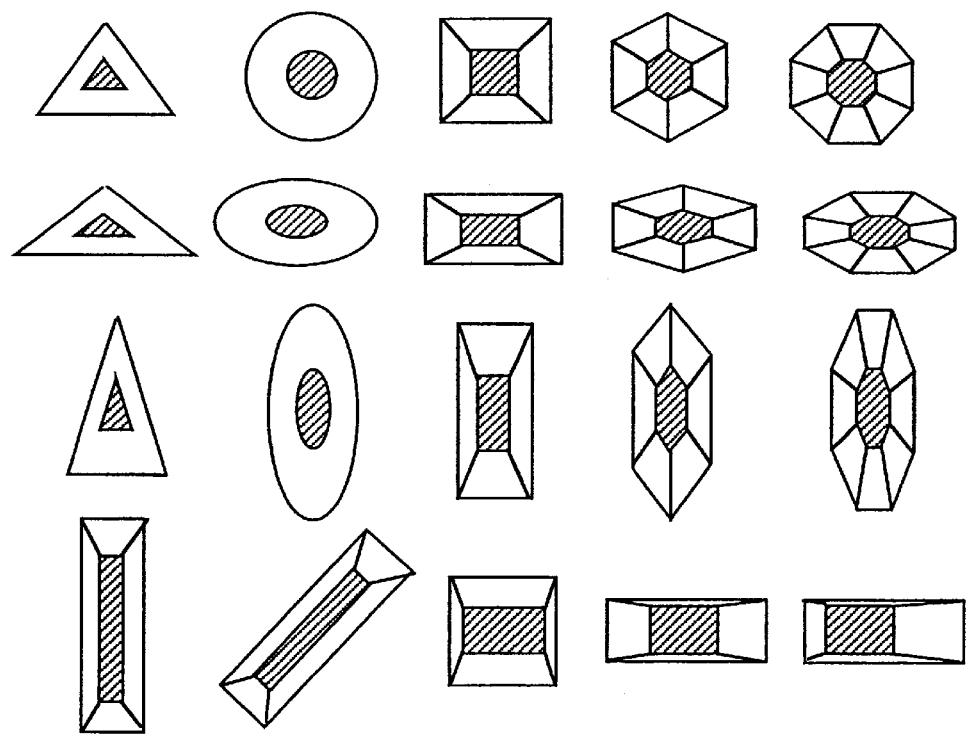

Next, description will be made of the dot shape according to exemplary embodiments of the invention. It is first to be mentioned that the invention is never restricted to any specific dot shape. In principle, the dots are to be implemented in the form of circular cone or rectangular prism. However, they may equally be implemented in the form of polygonal prisms such as quadrangular prism, hexagonal prism and octagonal prism such as can be seen in FIG. 30A which shows various polygonal dot shapes in perspective views or alternatively in the form of modified polygonal prisms, as shown in FIG. 30B. The dots of the shape mentioned above may further be elongated in vertical or horizontal direction and disposed in oblique orientations, as can be seen from FIG. 30B.

Figure 31A:
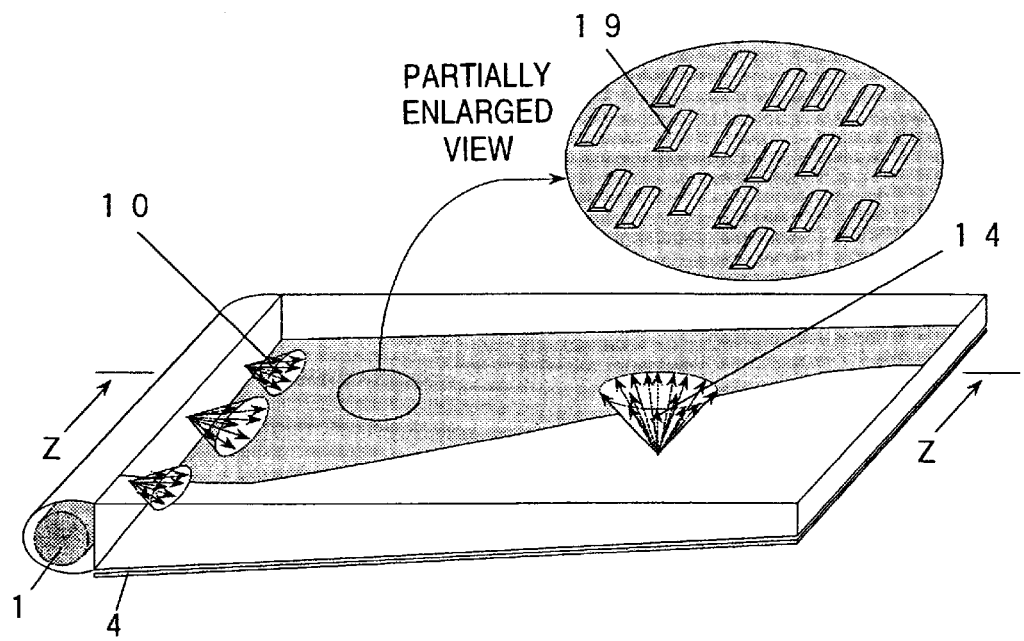
FIG. 31A is a perspective view showing another exemplary embodiment of the backlighting unit according to the present invention.
Figure 31B:
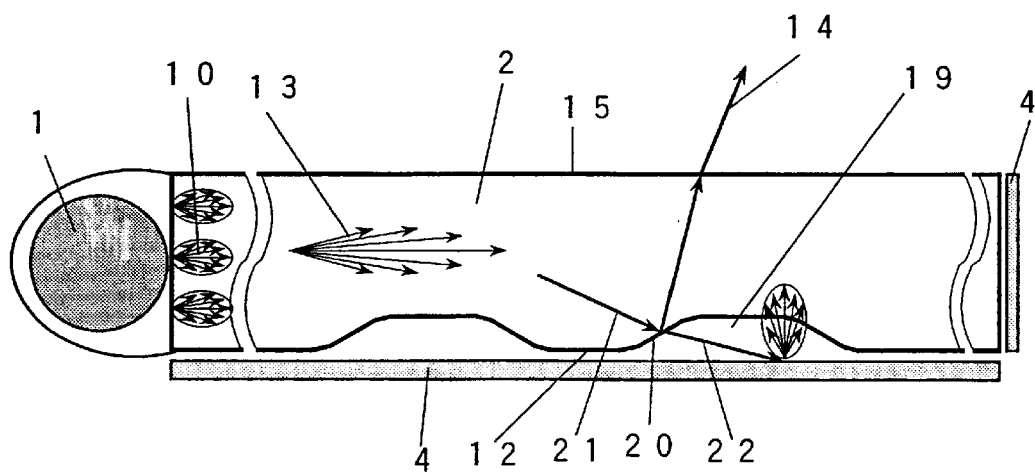
FIG. 31B is a sectional view taken along arrow line Z—Z in FIG. 31A.
Figure 32:
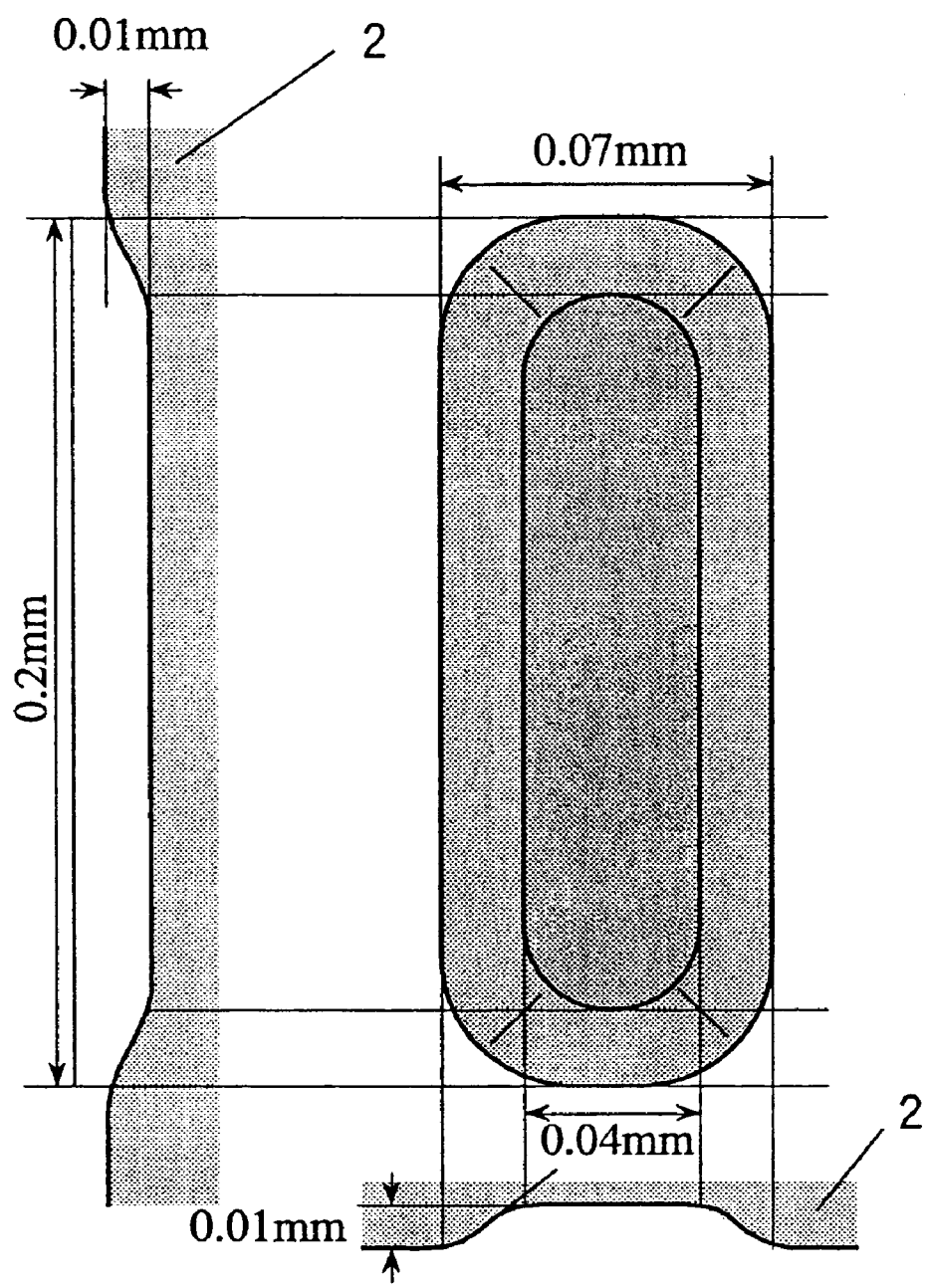
FIG. 32 is a view for illustrating geometry of a dot which can be adopted in a backlighting unit for the liquid crystal display device according to another embodiment of the invention.

FIGS. 31A and 31B show another exemplary embodiment of the backlighting unit according to the invention, wherein FIG. 31A is a perspective view showing the same as viewed obliquely from the top side and FIG. 31B is a sectional view taken along arrowed line Z—Z in FIG. 31A. Further, FIG. 32 is a view for illustrating geometry of the dot (small concave) in the backlighting unit according to the instant embodiment of the invention. In the figures, reference numeral 19 denotes small concaves (dots) and 20 denotes slanted surfaces thereof.

In the backlighting unit shown in FIGS. 31A and 31B, the light source 1, the light guide plate 2, and the reflecting sheet 4 represent the smallest unitary components, respectively. In FIG. 31B, there are illustrated schematically paths along which the traveling light rays 13 travel within the light guide plate according to the instant embodiment of the invention.

In FIG. 31B, the light rays 10 emitted from the light source 1 are incident on a left-hand end face of the light guide plate 2 as viewed in the figure and travel through the light guide plate 2 as travelling light rays 13 in the direction toward the other or opposite end face of the light guide plate 2 while undergoing repetitionally total reflections between the bottom surface 12 of the light guide plate and the light-transmissive surface 15. Those of the traveling light rays 13 which are incident on the slanted surfaces 20 of the small concaves are reflected on the slanted surface of the light-transmissive surface 16, whereon the light rays exit the light-transmissive surface 15 after refraction. The light rays 14 leaving the light guide plate 2 serve for backlighting the liquid crystal display device (not shown).

On the other hand, the light rays 22 which are not reflected at the slanted surfaces 20 are reflected at the reflecting sheet 4 to enter again the light guide plate, a portion of which exits through the light-transmissive surface with the remaining light rays traveling through the light guide plate. In this manner, by disposing the small concaves or dots properly, the light rays ravelling through the light guide plate are caused to leave the latter sequentially and gradually, thus ensuring uniform backlighting of the liquid crystal display device. Besides, by controlling the tilt angle of the slanted surfaces of the concaves or dots appropriately, it is possible to control properly the distribution of exit angles of the exit light-rays.

By virtue of the structure of the light guide plate according to the instant embodiment of the invention in which the small concaves 19 are formed at random position, distribution of the exit angles of the light rays can easily be controlled while evading occurrence of moiré.

FIG. 32 is a view for illustrating geometry of the dot according to the instant embodiment of the invention. In the case of the instant embodiment, the dot is implemented in a rectangular planar shape such that the length as viewed in the direction parallel to the light source differs from the length as viewed in the direction perpendicular to the light source and that the former is longer than the latter. In the dot disposition according to the instant embodiment of the invention, the dots are so disposed that the radial distribution function G(R) is substantially equal to zero in the range where the distance R is smaller than the dot width Ly and that a first peak of the radial distribution function G(R) makes appearance within the range of the distance R represented by Lx>R>Ly with a second peak of the radial distribution function G(R) appearing in the range represented by R>Lx, as shown in FIG. 14.

The optical member or light guide plate fabricated in the structure mentioned above can suffer substantially no moiré and ensure excellent uniformity of the luminance distribution.

Finally, other matters relevant to the invention will be briefly mentioned below.

As the material for forming the dots as well as various optical components of the liquid crystal display device, transparent plastic materials which are conventionally used for forming the light guide plate and various films developed for optical applications can generally be employed. As such plastic materials, there may be mentioned plastics of acrylic resin series, polycarbonate resin, polyester, polyacetal resin, polyurethane series resin and plastic materials curable under irradiation of ultraviolet rays. Among them, the acryl-series materials are preferred in view of transparency, cost and moldability. In this conjunction, it should however be mentioned that the present invention is not limited to the use of these specific materials.

Furthermore, the dots are not limited to the concaves or the convexes designed for reflecting the light rays but the dots adapted for scattering, refracting, diffracting, absorbing, transmitting, polarizing or deflecting the light rays may be employed, substantially to the same effect. Besides, those dots may be also employed which are imparted with different optical characteristics or optical activity such as the electro-optic effects. By way of example, in the case of the light guide plate provided with the light scattering dots, the light rays travelling through the light guide plate are gradually scattered by the dots, whereby the liquid crystal cell array can be illuminated uniformly over the whole surface.

Figure 33:
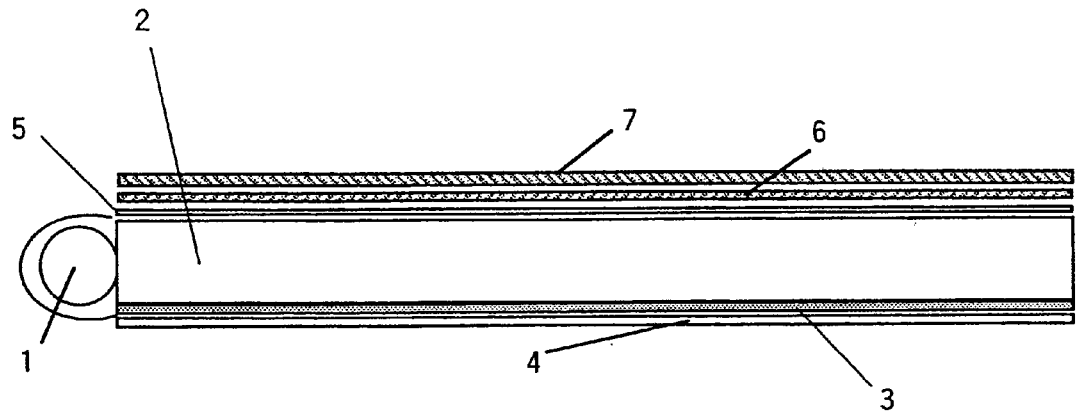
FIG. 33 is a sectional view showing schematically a structure of a conventional backlighting unit for a liquid crystal display device known heretofore.

FIG. 33 is a sectional view showing schematically a structure of a conventional backlighting unit for the liquid crystal display device known heretofore. Referring to the figure, numeral 1 denotes a light source, 2 denotes a light guide plate, 3 denotes a light scattering layer, 4 denotes a reflecting sheet, 5 denotes a diffusing sheet, numerals 6 and 7 denote light collecting plates, respectively. The present invention can be applied to such backlighting unit by providing the random dot pattern taught by the invention to the light scattering layer 3, the reflecting sheet 4, the diffusing sheet 5, the light collecting plate 6 or 7.

Figure 34:
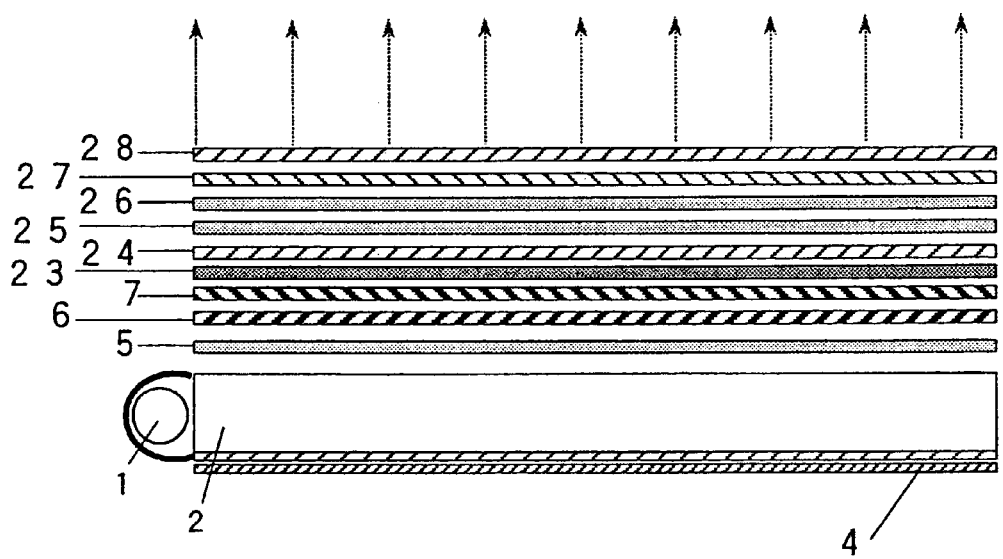
FIG. 34 is a sectional view showing schematically and generally a structure of a liquid crystal display device to which the present invention can be applied.

FIG. 34 shows schematically as a whole a structure of the liquid crystal display device to which the present invention can be applied. As can be seen from the figure, the liquid crystal display device is comprised of a light guide plate 2, a diffusing sheet 5, light collecting plates 6 and 7, a polarizing plate 23, a liquid crystal cell array 24, a common electrode 25, a color filter 26, a polarizing plate 27 and a field angle enlarging sheet 28 and so forth. The dot disposition proposed by the present invention can be provided in integral combination with the light collecting plate 6; 7, the polarizing plate 23; 27 or the field angle enlarging sheet 28 among others.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described above.

By way of example, the liquid crystal device to which the present invention can find application is never restricted to any specific one but conventional liquid crystal devices or panels may be employed. As the liquid crystal cells to which the invention can find application, there may be mentioned in general twisted nematic, super-twisted nematic, homogenous, thin film transistor or the like type liquid crystal or a liquid crystal cell of active matrix drive scheme or a simple matrix driving type. Furthermore, although the invention has been described in conjunction with the backlighting unit for the liquid crystal display device, it should be understood that the teachings of the invention disclosed herein can be applied to implementation of illuminating panels or plates or sheets in general which ensure luminance distribution of enhanced uniformity.

As is apparent from the foregoing, with the optical member formed with the dots with predetermined randomness, interference with regular pattern(s) can be suppressed. Thus, in the device in high such optical member is employed, occurrence of moiré can be effectively suppressed. Besides, the dot visibility problem can be successfully overcome.

Accordingly, all suitable modifications and equivalents may be resorted to, falling within the spirit and scope of the invention.

What is claimed is:

1. A liquid crystal display device, comprising:

a liquid crystal cell array; and a backlighting unit disposed at a rear side of said liquid crystal cell array and including at least a light guide plate, wherein at least either a top surface or a bottom surface of said light guide plate or alternatively a top surface or a bottom surface of an optical member disposed on the top or bottom surface of said light guide plate is provided with dots selected from a group consisting of (A) at least one of convex-shaped and concave-shaped dots having a property of at least one of reflecting, scattering, refracting, diffracting, absorbing, transmitting, polarizing and deflecting light rays, (B) dots having mutually different optical properties and (C) dots imparted with optical activity, and wherein in a region covering more than 80% of a whole dot-formed surface of said light guide plate or alternatively said optical member in which said dots are to be formed, said dots are so formed and disposed as to satisfy conditions that said dot-formed surface is divided into square regions each of 1 to 4 mm$^2$, value of a function g(R) obtained by averaging with weight values of radial distribution functions G(R) determined for each of said dots in each of said square regions in dependence on dot dispositional relations of said each dot to the other dots, respectively, and approximating a mean value of said radial distribution function values by a least square method falls within a range given by $$0 < S1/S2 < 0.4$$

provided that a ratio R/R0 is within a range of "3" to "6", where

R represents a distance from a center position of a given dot to another one as determined for each of said dots;

R0 represents a value obtained by dividing length of one side of said square region by a square root of the number of the dots contained in said square region;

S1 represents a value obtained by integrating a difference between a value of said function G(R) and a mean value of said functions G(R) with said ratio R/R0 on the condition that the value of said ratio R/R0 is within a range of "3" to "6"; and S2 represents a value obtained by integrating said mean value of said functions G(R) with said ratio R/R0 on the condition that the value of said ratio R/R0 is within a range of "3" to "6".

2. A liquid crystal display device, comprising:

a liquid crystal cell array; and a backlighting unit disposed at a rear side of said liquid crystal cell array and including at least a light guide plate, wherein at least either a top surface or a bottom surface of said light guide plate or alternatively a top surface or a bottom surface of an optical member disposed on the top or bottom surface of said light guide plate is provided with dots selected from a group consisting of (A) at least one of convex-shaped and concave-shaped dots having a property of at least one of reflecting, scattering, refracting, diffracting, absorbing, transmitting, polarizing and deflecting light rays, (B) dots having mutually different optical properties and (C) dots imparted with optical activity, and wherein in a region covering more than 99% of a whole dot-formed surface of said light guide plate or alternatively said optical member in which said dots are to be formed, said dots are so formed and disposed as to satisfy conditions that said dot-formed surface is divided into square regions each of 1 to 4 mm$^2$, value of a function G(R) obtained by averaging with weight values of radial distribution functions g(R) determined for each of said dots in each of said square regions in dependence on dot dispositional relations of said each dot to the other dots, respectively, and approximating a mean value of said radial distribution function values by a least square method falls within a range given by $$0 < S1/S2 < 0.4$$

provided that a ratio R/R0 is within a range of "3" to "6", where

R represents a distance from a center position of a given dot to another one as determined for each of said dots;

R0 represents a value obtained by dividing length of one side of said square region by a square root of the number of the dots contained in said square region;

S1 represents a value obtained by integrating a difference between a value of said function G(R) and a mean value of said functions G(R) with said ratio R/R0 on the condition that the value of said ratio R/R0 is within a range of "3" to "6"; and S2 represents a value obtained by integrating said mean value of said functions G(R) with said ratio R/R0 on the condition that the value of said ratio R/R0 is within a range of "3" to "6".

3. A liquid crystal display device, comprising:

a liquid crystal cell array; and a backlighting unit disposed at a rear side of said liquid crystal cell array and including at least a light guide plate, wherein at least either a top surface or a bottom surface of said light guide plate or alternatively a top surface or a bottom surface of an optical member disposed on the top or bottom surface of said light guide plate is provided with dots selected from a group consisting of (A) at least one of convex-shaped and concave-shaped dots having a property of at least one of reflecting, scattering, refracting, diffracting, absorbing, transmitting, polarizing and deflecting light rays, (B) dots having mutually different optical properties and (C) dots imparted with optical activity, and wherein in a region covering more than 80% of a whole dot-formed surface of said light guide plate or alternatively said optical member in which said dots are to be formed, said dots are so formed and disposed as to satisfy conditions that said dot-formed surface is divided into square regions each of 1 to 4 mm$^2$, value of a function G(R) obtained by averaging with weight values of radial distribution functions g(R) determined for each of said dots in each of said square regions in dependence on dot dispositional relations of said each dot to the other dots, respectively, and approximating a mean value of said radial distribution function values by a least square method falls within a range given by $$0 < S1/S2 < 0.02$$

provided that a ratio R/R0 is within a range of "3" to "6", where
R represents a distance from a center position of a given dot to another one as determined for each of said dots;

R0 represents a value obtained by dividing length of one side of said square region by a square root of the number of the dots contained in said square region;

S1 represents a value obtained by integrating a difference between a value of said function G(R) and a mean value of said functions G(R) with said ratio R/R0 on the condition that the value of said ratio R/R0 is within a range of "3" to "6"; and S2 represents a value obtained by integrating said mean value of said functions G(R) with said ratio R/R0 on the condition that the value of said ratio R/R0 is within a range of "3" to "6".

4. A liquid crystal display device according to claim 1, wherein said radial distribution function G(R) is a function which satisfies the condition that a ratio G1/G2 is smaller than 0.95, where G1 represents a mean value of the values of said radial distribution function G(R) within a range of said values of R not greater than a radius r of a circle having an area equal to that of the dot; and G2 represents a mean value of the values of said radial distribution function G(R) within a range of the values of R from zero to 5R0.

5. A liquid crystal display device according to claim 1, wherein said radial distribution function G(R) is a function which satisfies the condition that a ratio G1/G2 is smaller than 0.05, where G1 represents a mean value of the values of said radial distribution function G(R) within a range of said values of R not greater than a radius r of a circle having an area equal to that of the dot; and G2 represents a mean value of the values of said radial distribution function G(R) within a range of the values of R from zero to 5R0.

6. A liquid crystal display device according to claim 1, wherein when each of said square regions not less than 80% of all the square regions is divided equally into four subregions, dot density in each of said subregions is within a range of ±20% of the mean dot density of said square region.

7. A liquid crystal display device according to claim 1, wherein a diameter of a circle of an area equal to that of said dot is not smaller than 0.001 mm and not greater than 0.15 mm in each of at least 80% of said dots.

8. A liquid crystal display device according to claim 1, wherein a diameter of a circle of an area equal to that of said dot is not smaller than 0.01 mm and not greater than 0.05 mm in each of at least 80% of said dots.

9. A liquid crystal display device according to claim 1, wherein said dots are so formed and disposed that the radial distribution function G(R) is substantially equal to zero in the range of values of R which is smaller than a dot width Ly and has at least two peaks, wherein at least one of said peaks makes appearance within a range given by Lx>R>Ly; and wherein at least one of said peaks makes appearance within a range given by R>Lx, where Lx represents a width of each of said dots in a direction parallel to a light source; and Ly represents a width of each of said dots in a direction perpendicular to said light source.

10. A liquid crystal display device according to claim 1, wherein in respect to dot size, at least 80% of all the dots are so formed as to meet the conditions that Lx>Ly, 0.05 mm<Lx<1.0 mm and 0.03 mm<Ly<0.09 mm, where Lx represents a width of each of said dots in a direction parallel to a light source; and Ly represents a width of each of said dots in a direction perpendicular to said light source.

11. A liquid crystal display device according to claim 1, wherein in respect to dot size, at least 80% of all dots are so formed as to meet the conditions that Lx>Ly×2, 0.1 mm<Lx<0.3 mm and 0.03 mm<Ly<0.09 mm, where Lx represents a width of each of said dots in a direction parallel to a light source; and Ly represents a width of each of said dots in a direction perpendicular to said light source.

12. A liquid crystal display device according to claim 1, wherein said dots are so formed and disposed that area of each of the individual dots occupying at least 80% of all the dots is so selected that it is not smaller than 0.0001 $mm^2$ and not greater than 0.09 $mm^2$.

13. A liquid crystal display device according to claim 1, wherein said dot is so formed and disposed that the value of the radial distribution function G(R) becomes substantially zero within a range of R smaller than the diameter of said dot.

14. A liquid crystal display device according to claim 1, wherein disposition of said dots is determined by making use of a random number.

15. A liquid crystal display device according to claim 14, wherein positions deviated from lattice points disposed regularly are selected as coordinate positions for the dots at least in some of said square regions and deviations of the dot positions from said lattice points, respectively, are determined by making use of random numbers.

16. A liquid crystal display device according to claim 15, wherein said dots are formed and disposed at random without overlapping one another by deleting only the dots located at the coordinates at which inter-dot overlap or extremely close proximity takes place after determination of the dot coordinate positions or in the course of determining the dot coordinate positions and thereafter determining again the coordinates for the deleted dots by making use of newly generated random numbers so that said dots are disposed at random without mutually overlapping.

17. A liquid crystal display device according to claim 14, wherein said dot-formed surface as a whole is divided into subregions as cells and said dot disposition in each of said cells is determined on the basis of random numbers.

18. A liquid crystal display device according to claim 1, wherein said dots imparted with optical activity have an electro-optic effect.

19. A liquid crystal display device according to claim 2, wherein said dots imparted with optical activity have an electro-optic effect.

20. A liquid crystal display device according to claim 3, wherein said dots imparted with optical activity have an electro-optic effect.

* * * * *